United States Patent
Mitarai et al.

(10) Patent No.: US 8,209,172 B2
(45) Date of Patent: Jun. 26, 2012

(54) PATTERN IDENTIFICATION METHOD, APPARATUS, AND PROGRAM

(75) Inventors: Yusuke Mitarai, Yokohama (JP); Masakazu Matsuga, Chiba (JP); Katsuhiko Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 582 days.

(21) Appl. No.: 10/530,275

(22) PCT Filed: Dec. 16, 2004

(86) PCT No.: PCT/JP2004/019277
§ 371 (c)(1),
(2), (4) Date: Apr. 5, 2005

(87) PCT Pub. No.: WO2005/059811
PCT Pub. Date: Jun. 30, 2005

(65) Prior Publication Data
US 2006/0074653 A1 Apr. 6, 2006

(30) Foreign Application Priority Data
Dec. 16, 2003 (JP) .................... 2003-417973

(51) Int. Cl.
*G10L 15/00* (2006.01)
(52) U.S. Cl. ......... 704/240; 704/236; 704/243; 704/244
(58) Field of Classification Search .................. 704/240
See application file for complete search history.

(56) References Cited

U.S. PATENT DOCUMENTS

| | | | | |
|---|---|---|---|---|
| 5,570,434 A | * | 10/1996 | Badique | 382/279 |
| 7,039,233 B2 | | 5/2006 | Mori et al. | 382/181 |
| 7,054,850 B2 | | 5/2006 | Matsugu | 706/48 |
| 2002/0038294 A1 | * | 3/2002 | Matsugu | 706/20 |
| 2002/0181765 A1 | * | 12/2002 | Mori et al. | 382/158 |
| 2002/0181775 A1 | * | 12/2002 | Matsugu | 382/195 |
| 2006/0115157 A1 | | 6/2006 | Mori et al. | 328/190 |

FOREIGN PATENT DOCUMENTS

| | | |
|---|---|---|
| EP | 1164537 A2 | 12/2001 |
| EP | 1 262 908 | 12/2002 |
| JP | 2003-58888 A | 2/2003 |

OTHER PUBLICATIONS

Summons to Attend Oral Proceedings issued on Dec. 12, 2008 in corresponding European Patent Application No. 04807634.3.
Japanese Office Action dated Aug. 3, 2010 in corresponding Japanese Patent Application No. 2004-362869.

* cited by examiner

*Primary Examiner* — Leonard Saint Cyr
(74) *Attorney, Agent, or Firm* — Fitzpatrick, Cella, Harper & Scinto

(57) ABSTRACT

Pattern recognition capable of robust identification for the variance of an input pattern is performed with a low processing cost while the possibility of identification errors is decreased. In a pattern recognition apparatus which identifies the pattern of input data from a data input unit (11) by using a hierarchical feature extraction processor (12) which hierarchically extracts features, an extraction result distribution analyzer (13) analyzes a distribution of at least one feature extraction result obtained by a primary feature extraction processor (121). On the basis of the analytical result, a secondary feature extraction processor (122) performs predetermined secondary feature extraction.

17 Claims, 17 Drawing Sheets

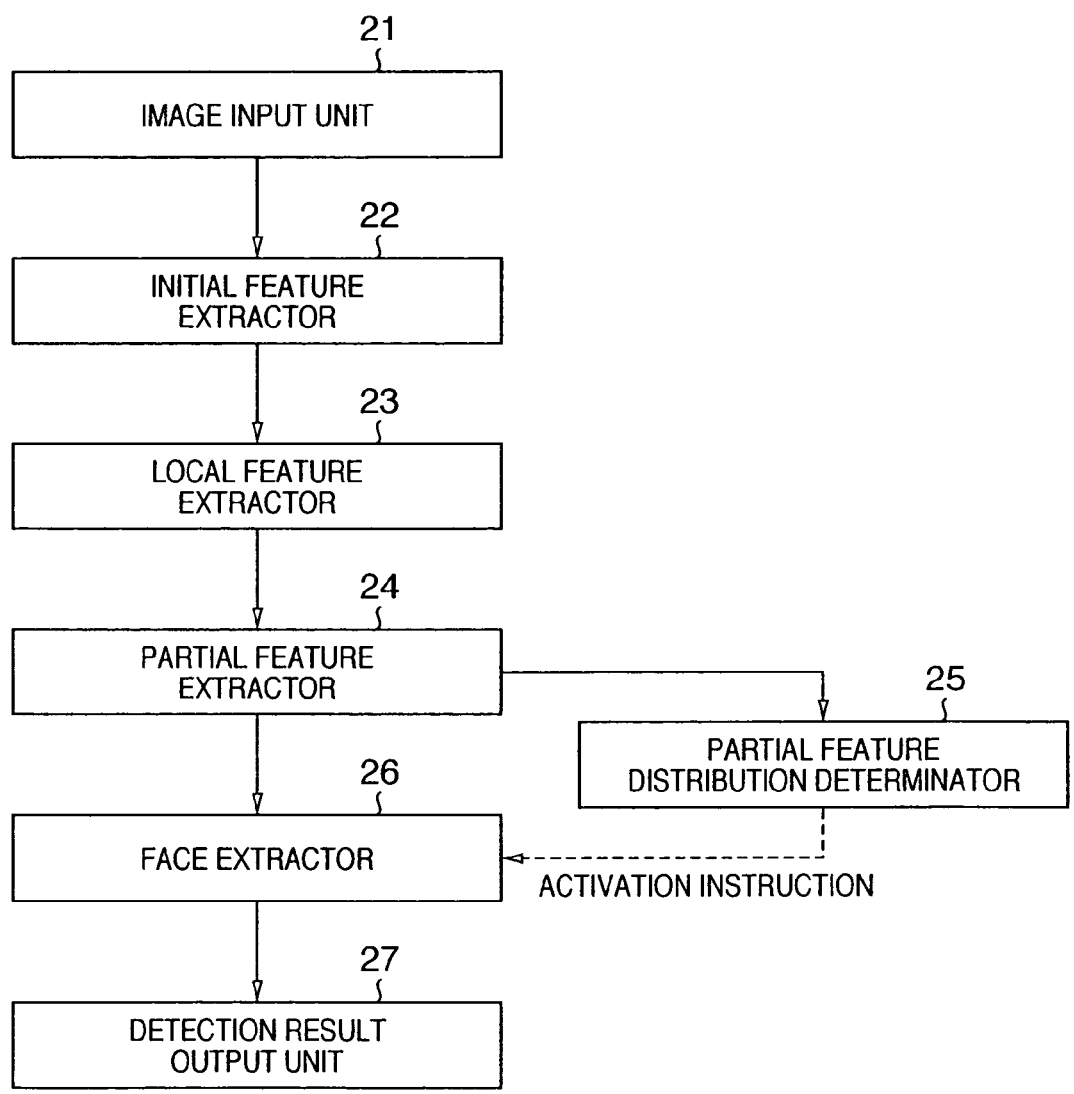

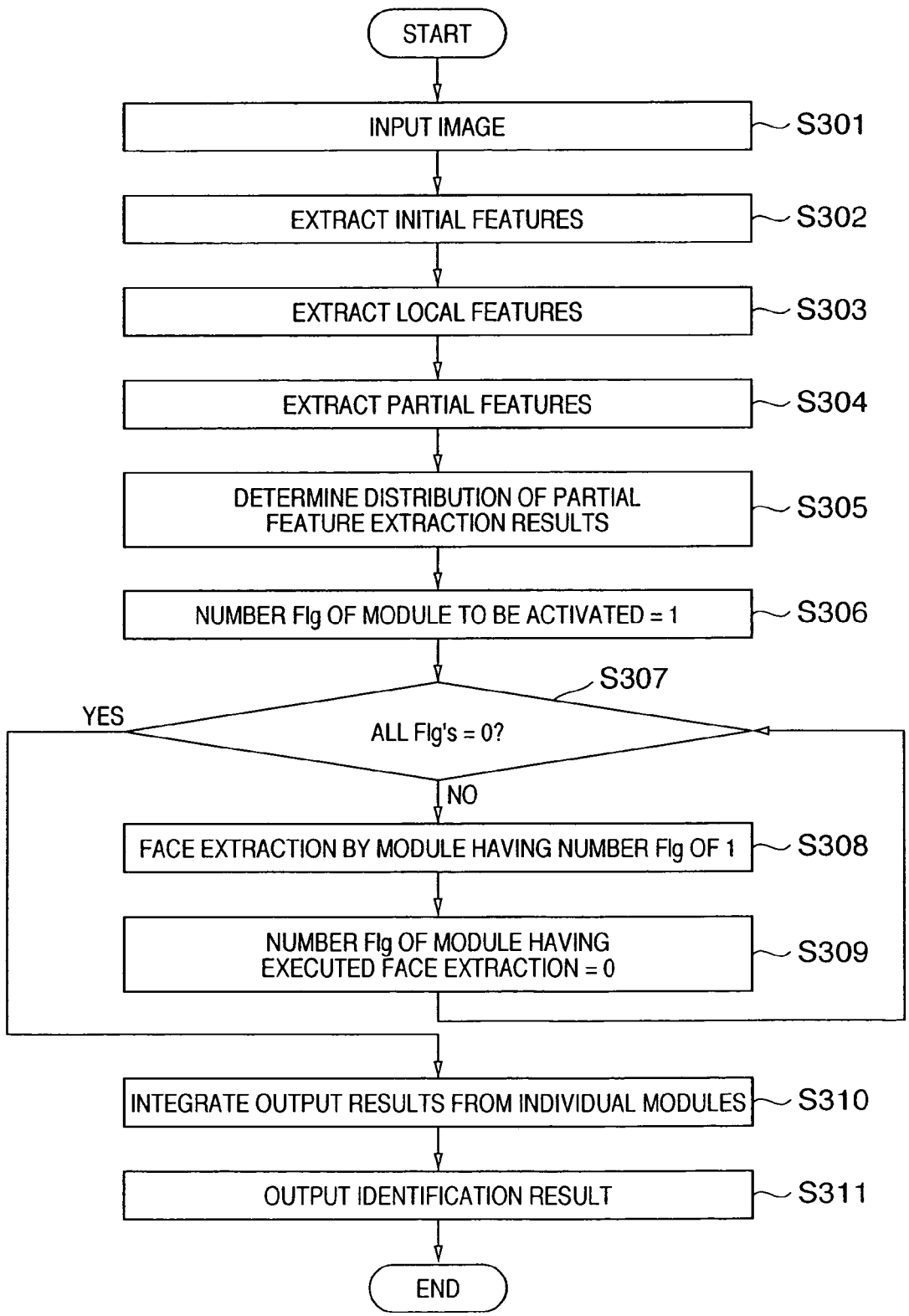

i ii iii iv v a  b  c  d

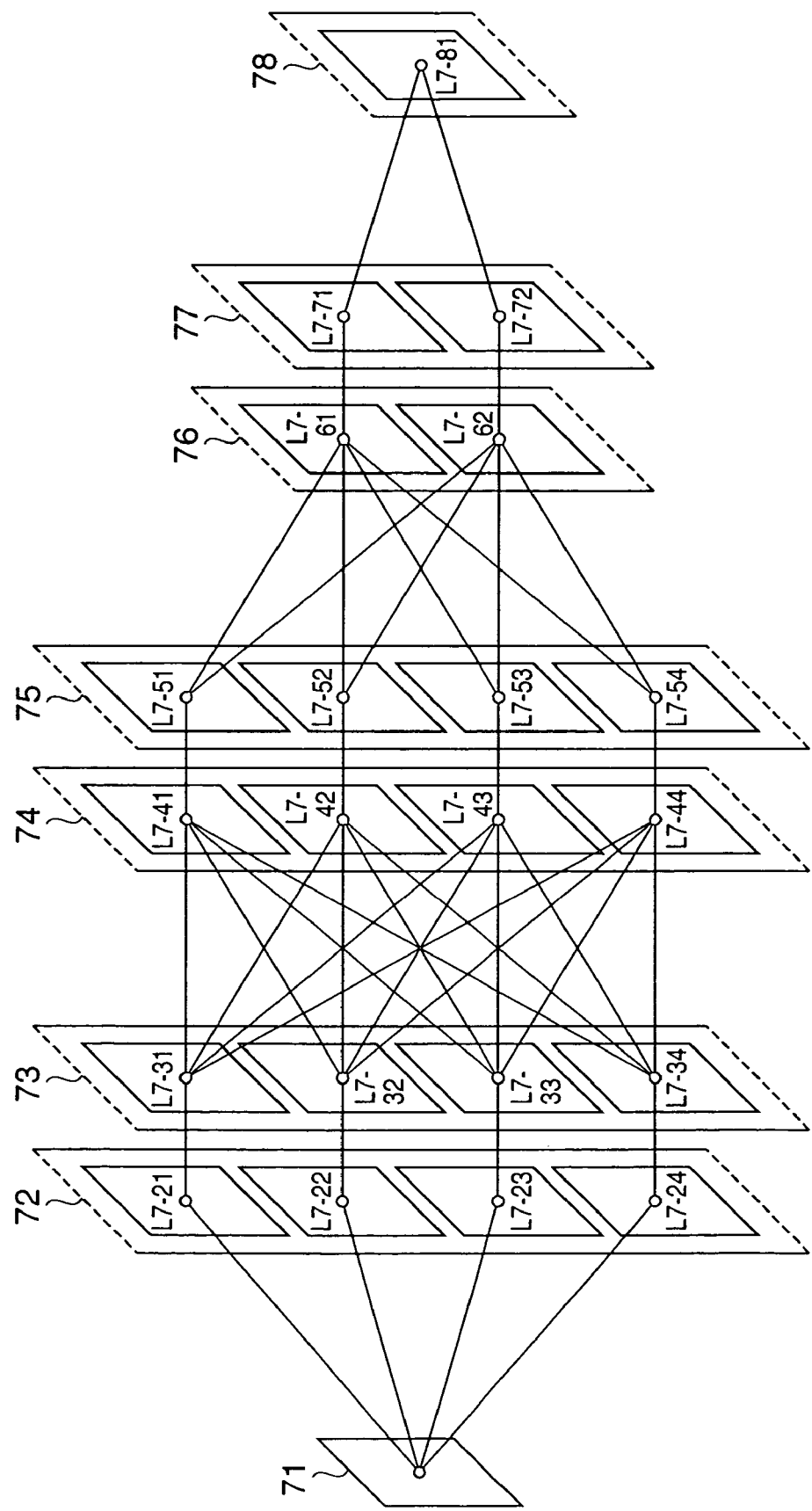

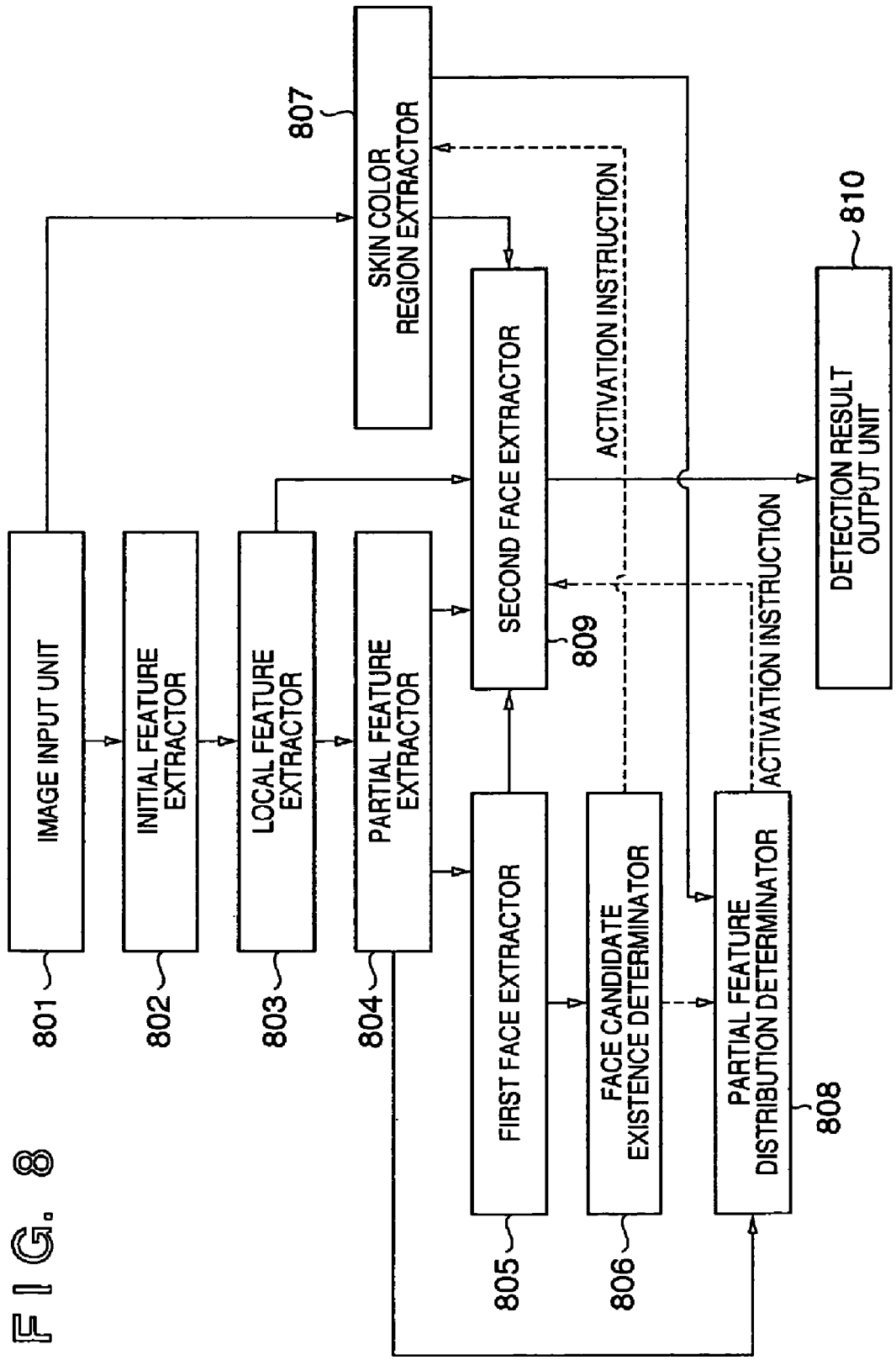

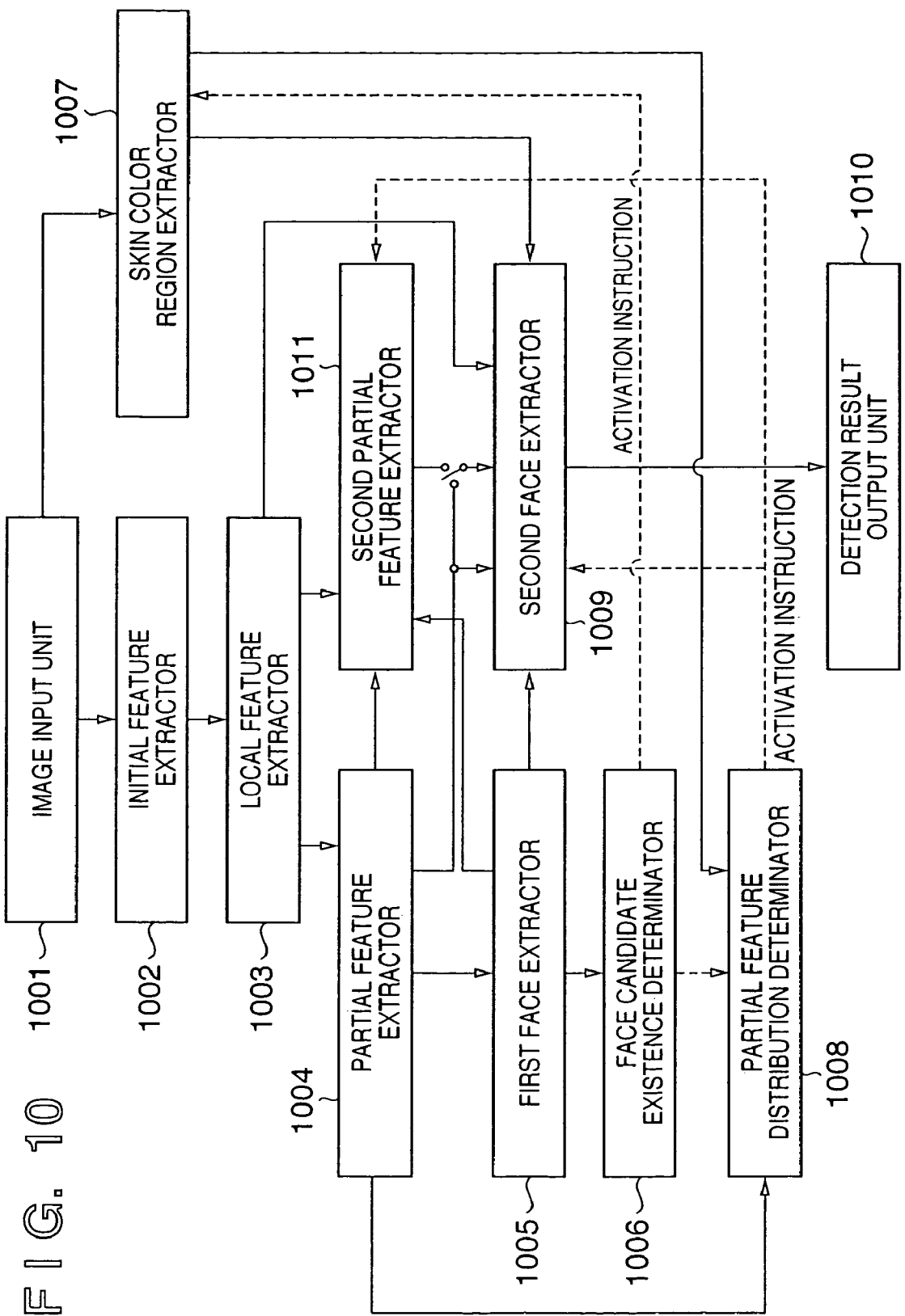

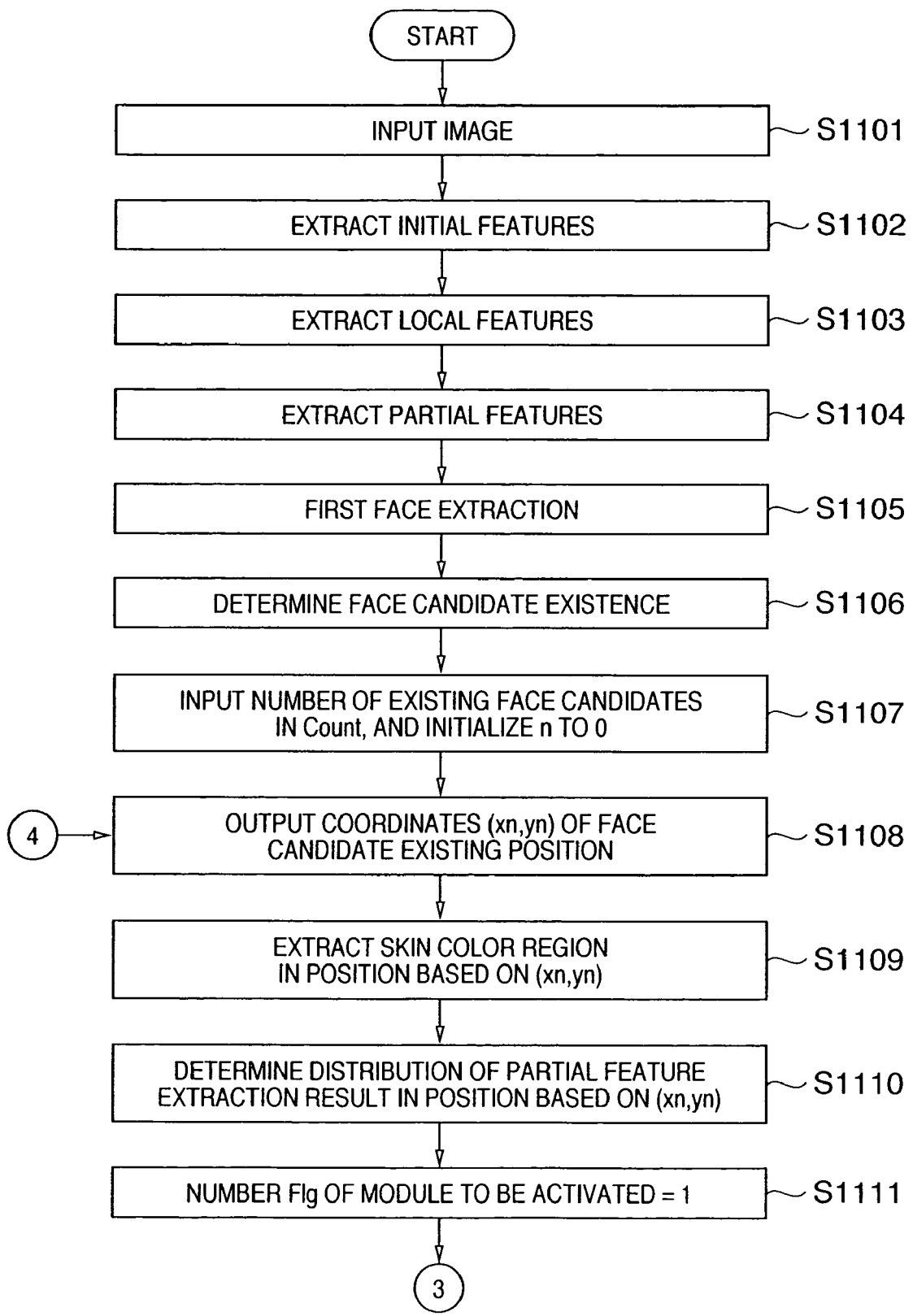

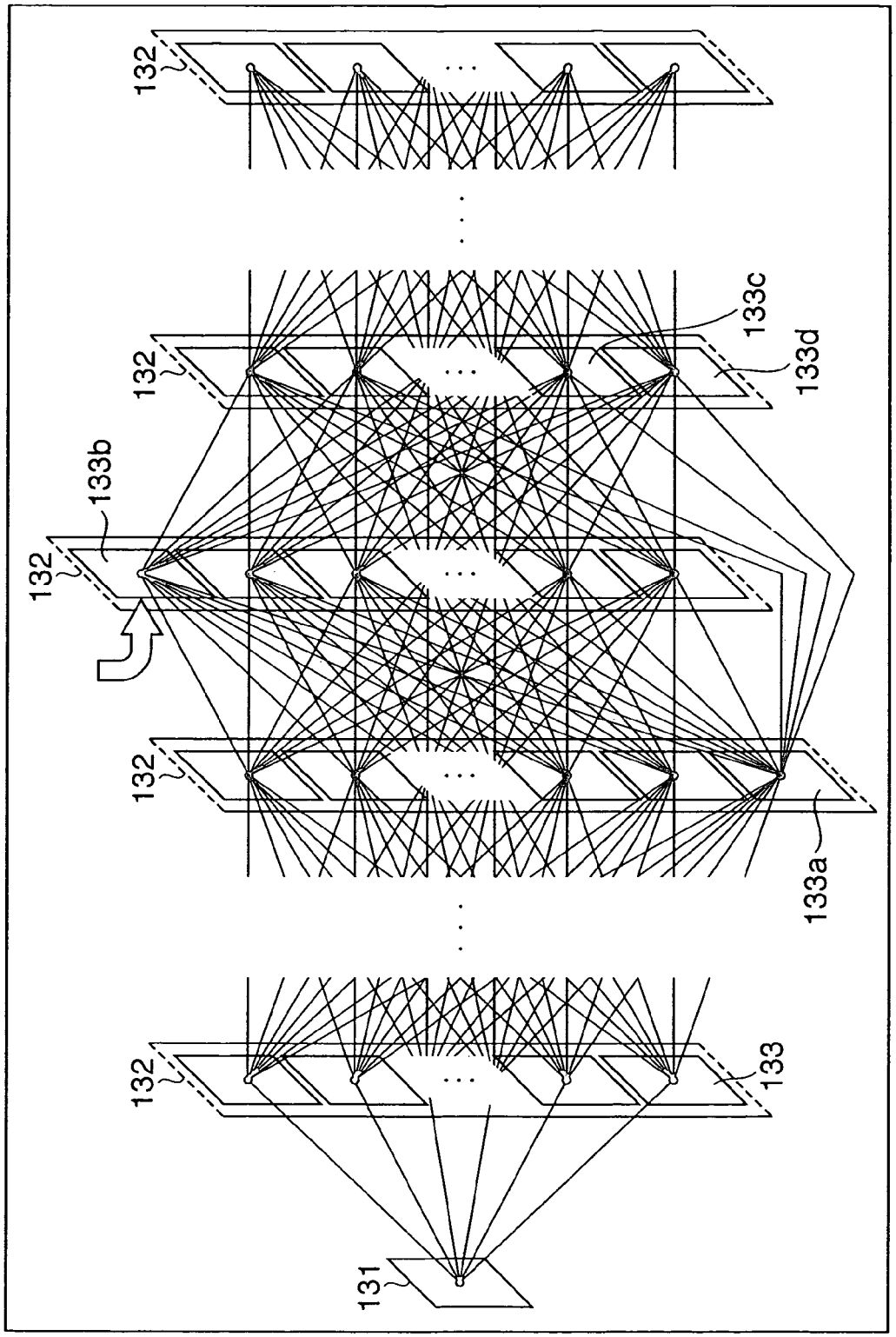

F I G. 14B
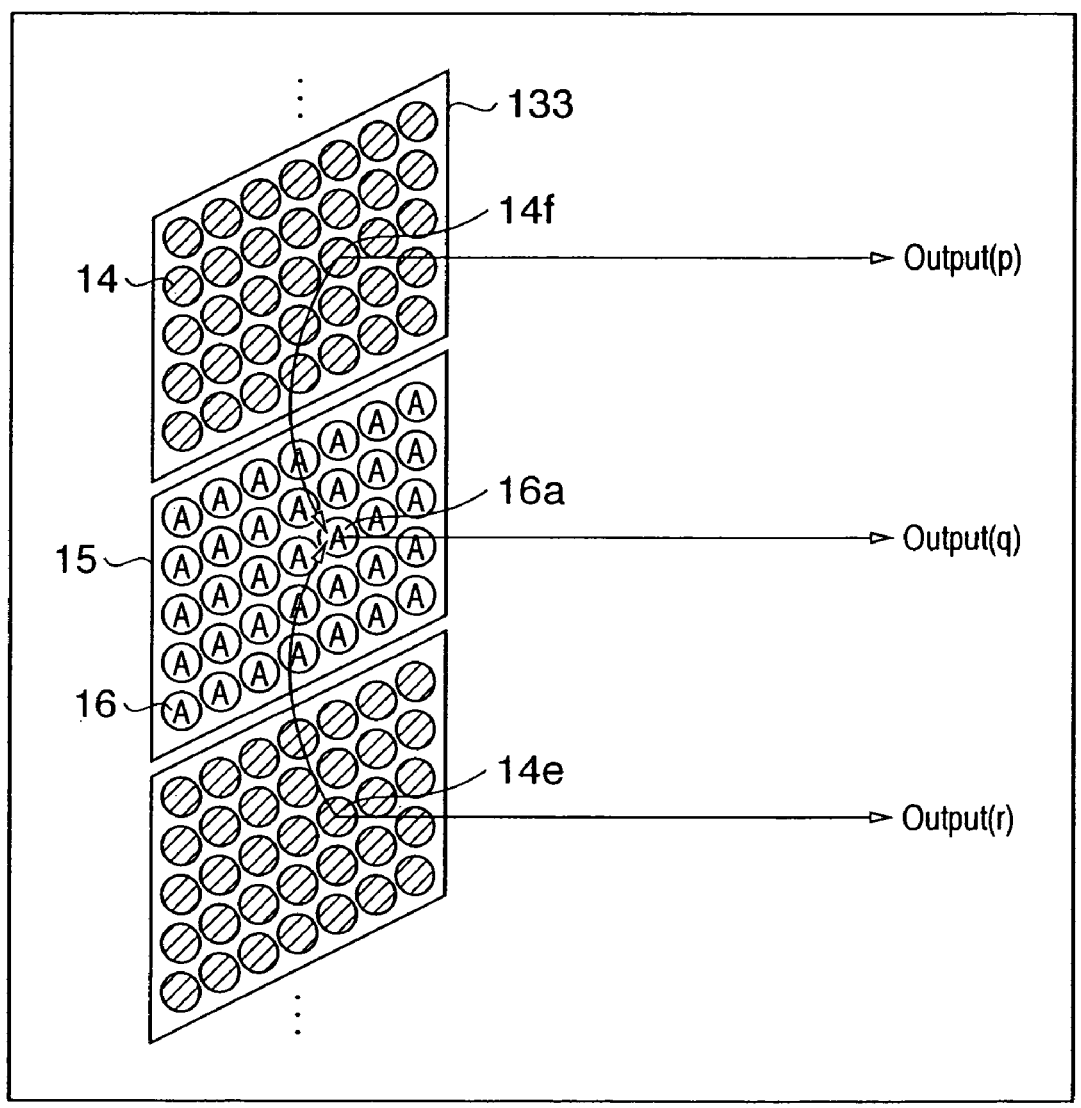

PATTERN IDENTIFICATION METHOD, APPARATUS, AND PROGRAM

TECHNICAL FIELD

The present invention relates to a method, apparatus, and program for identifying the pattern of an input signal by hierarchically extracting features in, e.g., image recognition or voice recognition.

BACKGROUND ART

There is a technique which identifies the pattern of an input signal by hierarchically extracting features. This method extracts a high-order feature by using features which form the feature to be extracted and have orders lower than that of the feature to be extracted. Accordingly, the method has the characteristic that it can perform robust identification for the variance of an identification pattern. However, to increase the robustness against the variance of a pattern, it is necessary to increase the number of types of features to be extracted, and this increases the processing cost. If the number of types of features to be extracted is not increased, the possibility of identification errors increases.

To solve the above problems, the following pattern recognition method is proposed. First, feature vectors of patterns of individual classes are arranged in descending order of vector component dispersion to form dictionary patterns, and feature vectors are generated from an input pattern. Then, matching with dictionary patterns of high orders up to the Nth-order is performed. On the basis of the matching result, matching with lower orders is performed. In this manner, the processing cost can be reduced.

The following pattern recognition dictionary formation apparatus and pattern recognition apparatus are also proposed. First, feature vectors are extracted from an input pattern, and classified into clusters in accordance with the degree of matching with the standard vector of each cluster. Category classification is then performed in accordance with the degree of matching between category standard vectors in the classified clusters of the input pattern and the feature vectors. Consequently, the cost of the matching process can be reduced.

DISCLOSURE OF INVENTION

It is, however, being desired to perform pattern recognition capable of performing robust identification for the variance of an input pattern, and reducing the processing cost while decreasing the possibility of identification errors.

To solve the above problems, according to the present invention, a pattern identification method of identifying a pattern of input data by hierarchically extracting features of the input data comprises a first feature extraction step of extracting a feature of a first layer, an analysis step of analyzing a distribution of a feature extraction result in the first feature extraction step, and a second feature extraction step of extracting a feature of a second layer higher than the first layer on the basis of the distribution analyzed in the analysis step.

According to another aspect of the present invention, a pattern identification apparatus for identifying a pattern of input data by hierarchically extracting features of the input data comprises first feature extracting means for extracting a feature of a first layer, analyzing means for analyzing a distribution of a feature extraction result obtained by the first feature extracting means, and second feature extracting means for extracting a feature of a second layer higher than the first layer on the basis of the distribution analyzed by the analyzing means.

According to still another aspect of the present invention, a pattern identification program for allowing a computer to identify a pattern of input data by hierarchically extracting features of the input data comprises a first feature extraction step of extracting a feature of a first layer, an analysis step of analyzing a distribution of a feature extraction result in the first feature extraction step, and a second feature extraction step of extracting a feature of a second layer higher than the first layer on the basis of the distribution analyzed in the analysis step.

According to still another aspect of the present invention, there is provided a pattern identification method of identifying a pattern of input data by hierarchically extracting features of the input data comprises a first feature extraction step of extracting a feature of a first layer, and a second feature extraction step of extracting a feature of a second layer higher than the first layer by one on the basis of a feature extraction result in the first layer and a feature extraction result in a layer other than the first layer.

According to still another aspect of the present invention, a pattern identification apparatus for identifying a pattern of input data by hierarchically extracting features of the input data comprises first feature extraction means for extracting a feature of a first layer, and second feature extraction means for extracting a feature of a second layer higher than the first layer by one on the basis of a feature extraction result in the first layer and a feature extraction result in a layer other than the first layer.

According to still another aspect of the present invention, a pattern identification program for causing a computer to identify a pattern of input data by hierarchically extracting features of the input data comprises a first feature extraction step of extracting a feature of a first layer, and a second feature extraction step of extracting a feature of a second layer higher than the first layer by one on the basis of a feature extraction result in the first layer and a feature extraction result in a layer other than the first layer.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 2 is a view showing the functional arrangement of the pattern identification apparatus according to the first embodiment;

FIG. 3 is a flowchart showing the flow of processing in the first embodiment;

FIG. 7 is a view showing the arrangement of a basic convolutional neural network;

FIG. 8 is a view showing the functional arrangement of a pattern identification apparatus according to the second embodiment;

FIG. 10 is a view showing the functional arrangement of a pattern identification apparatus according to the third embodiment;

FIGS. 11A and 11B are flowcharts showing the flow of processing in the third embodiment.

FIG. 13 is a view showing the hierarchical structure according to the fourth embodiment;

FIG. 14B is a view for explaining the integrating process according to the fourth embodiment.

BEST MODE FOR CARRYING OUT THE INVENTION

Preferred embodiments of the present invention will now be described in detail in accordance with the accompanying drawings.

(First Embodiment)

As the first embodiment of the present invention, a method of identifying whether input two-dimensional image data is a certain specific category will be explained below.

Figure 4:
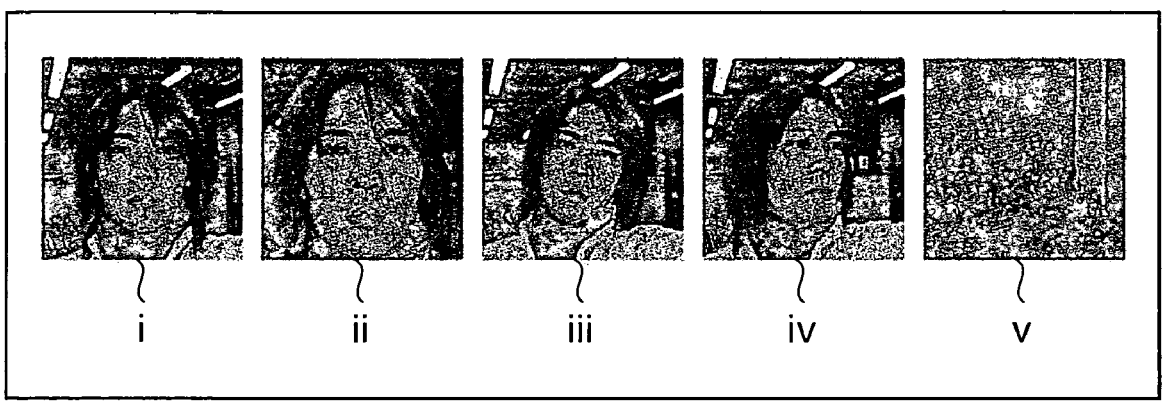
FIG. 4 is a view showing face images as an identification category in the first embodiment.

This embodiment assumes, as identification categories, face images as indicated by i to iv in FIG. 4 in each of which the center of a face is present in substantially the center of an input image, and a non-face image as indicated by v in FIG. 4 which is not a face image. A method of identifying whether input image data is the former or the latter of these two categories will be described below.

In this embodiment, identification of whether input image data is a face image or not will be explained. However, the application of the present invention is not limited to such images. That is, the present invention is also applicable to other image patterns or to a case in which input data is voice data. In addition, to simplify the explanation, identification of whether input image data falls under a single category, i.e., a face, will be described below. However, the present invention is applicable not only to identification of a single category but also to identification of a plurality of categories.

Figure 1A:
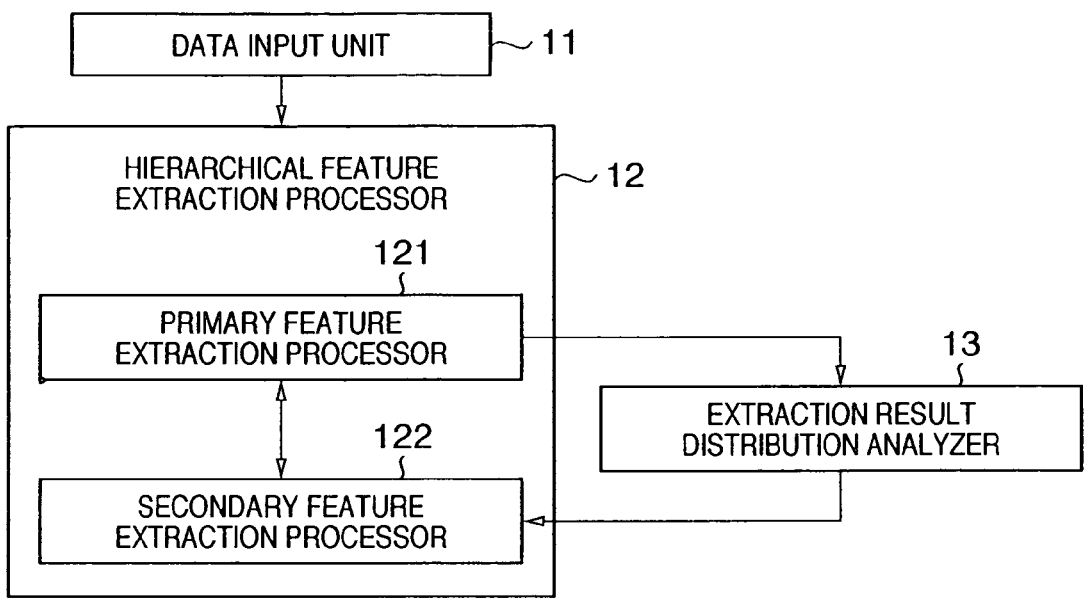
FIG. 1A is a view showing the basic arrangement of a pattern identification apparatus according to the first embodiment.
Figure 1B:
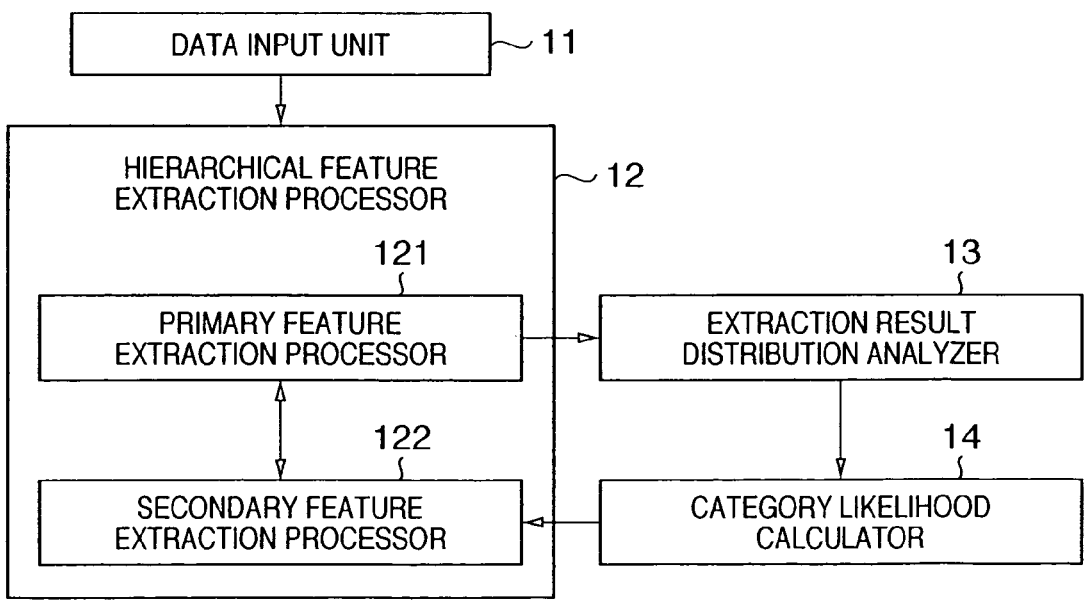
FIG. 1B is a view showing the basic arrangement of the pattern identification apparatus according to the first embodiment.

FIGS. 1A and 1B illustrate the basic arrangements of a pattern identification apparatus. An outline of this pattern identification apparatus will be described below with reference to FIGS. 1A and 1B.

A data input unit 11 shown in FIG. 1A inputs data as an object of pattern identification. A hierarchical feature extraction processor 12 hierarchically extracts features from the input data, and identifies the pattern of the input data. The hierarchical feature extraction unit 12 includes a primary feature extraction processor 121 for performing a primary feature extraction process, and a secondary feature extraction processor 122 for performing a secondary feature extraction process. An extraction result distribution analyzer 13 analyzes the distribution of features extracted by the primary feature extraction processor 121.

In this pattern identification apparatus, the data input unit 11 inputs data to be identified. The hierarchical feature extraction processor 12 performs a hierarchical feature extraction process for this input data. In this hierarchical extraction process, the primary feature extraction processor 121 hierarchically extracts a plurality of primary features from the input data. Then, the extraction result distribution analyzer 13 analyzes the distribution of at least one type of a primary feature extracted by the primary feature extraction processor 121. In addition, on the basis of the result of analysis, the second feature extraction processor 122 extracts secondary features.

FIG. 1B shows another basic arrangement of the pattern identification apparatus. An outline of this pattern identification apparatus will be explained below with reference to FIG. 1B.

Referring to FIG. 1B, a data input unit 11 inputs data as an object of pattern identification. A hierarchical feature extraction processor 12 hierarchically extracts features from the input data, and identifies the pattern of the input data. The hierarchical feature extraction unit 12 includes a primary feature extraction processor 121 for performing a primary feature extraction process, and a secondary feature extraction processor 122 for performing a secondary feature extraction process. An extraction result distribution analyzer 13 analyzes the distribution of features extracted by the primary feature extraction processor 121. A category likelihood calculator 14 calculates the likelihood of each category of secondary features from the result of analysis by the extraction result distribution analyzer 13.

In this pattern identification apparatus, the data input unit 11 inputs data to be identified. The hierarchical feature extraction processor 12 performs a hierarchical feature extraction process for this input data. In this hierarchical extraction process, the primary feature extraction processor 121 hierarchically extracts a plurality of primary features from the input data. Then, the extraction result distribution analyzer 13 analyzes the distribution of at least one type of a primary feature extracted by the primary feature extraction processor 121. On the basis of the result of analysis by the extraction result distribution analyzer 13, the category likelihood calculator 14 calculates the likelihood of each category of secondary features to be extracted by the secondary feature extraction processor 122. The second feature extraction processor 122 extracts secondary features which belong to categories each having a calculated likelihood equal to or larger than a predetermined value.

FIG. 2 shows the functional arrangement of the pattern identification apparatus according to this embodiment. FIG. 3 shows the flow of processing in this embodiment. The processing in this embodiment will be described below with reference to FIGS. 2 and 3. Referring to FIG. 2, the solid-line arrows indicate the flows of actual signal data, and the broken-line arrow indicates the flow of instruction signals, such as operation instructions, rather than actual signal data. The same expression is used in FIGS. 8 and 10 (to be described later).

First, in step S301, an image input unit 21 inputs image data as an object of identification. Although this input image data is a grayscale image in this embodiment, an RGB color image may also be used.

In step S302, an initial feature extractor 22 extracts at least one initial feature, such as an edge in a specific direction, of the input image. In step S303, a local feature extractor 23 extracts local features, e.g., an edge line segment having a specific length and the end points of this edge line segment, by using the initial features extracted by the initial feature extractor 22. In step S304, a partial feature extractor 24 extracts partial features such as the eye and mouth by using the local features extracted by the local feature extractor 23.

In step S305, a partial feature distribution determinator 25 analyzes the distribution, in the image, of the partial features extracted by the partial feature extractor 24. In step S306, in accordance with the analytical result, the partial feature distribution determinator 25 issues an activation instruction to a face extractor 26, and turns on flags of face extraction modules to be activated.

The face extractor 26 is a processor which extracts the face by using the partial features extracted by the partial feature extractor 24. The face extractor 26 is made up of a plurality of modules each of which extracts the face in accordance with a specific size or direction, and only modules having received the activation instruction perform face extraction. In steps S307 to S309, face extraction modules having ON flags sequentially perform the face extraction process, and the flag of each face extraction module having executed face extraction is turned off. If there is no more face extraction module having an ON flag, the face extraction process is terminated.

In steps S310 and S311, a detection result output unit 27 integrates the face extraction results from the face extraction modules, determines whether the input image is a face image or a non-face image, and outputs the determination result.

Details of the processing performed by each processor on and after the initial feature extractor 22 for the image data input from the image input unit 21 will be described below.

Initial features extracted from the input image by the initial feature extractor 22 are desirably constituent elements of features to be extracted by the local feature extractor 23 as a higher layer. In this embodiment, a filtering process is simply performed in each position of an input image by using differential filters in a longitudinal direction, a lateral direction, an oblique direction toward the upper right corner, and an oblique direction toward the upper left corner, thereby extracting four types of features such as a vertical edge, horizontal edge, and oblique edges. Although the filtering process as described above is performed in this embodiment, it is also possible to extract features by performing template matching in each position of an input image by using a prepared template image indicating initial features.

Figure 5:
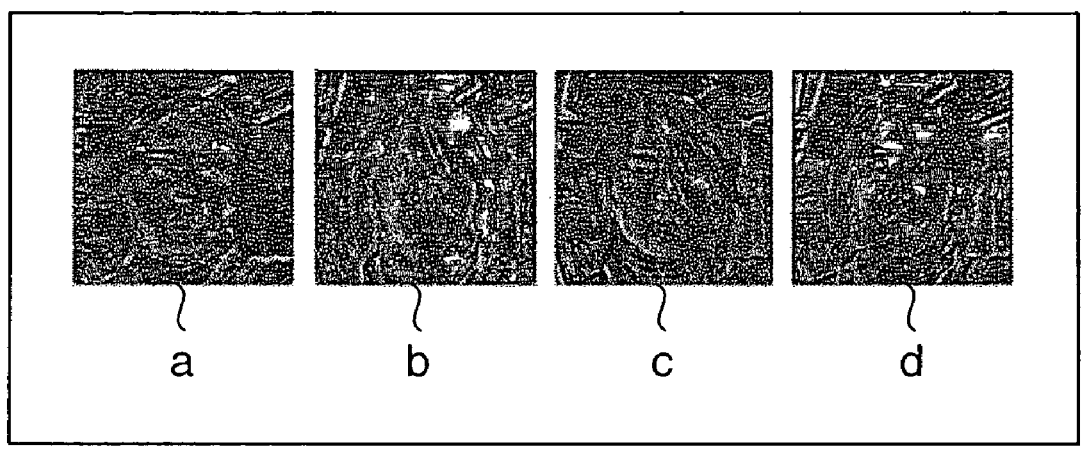
FIG. 5 is a view showing four types of initial feature extraction results.

The extracted feature is held as information such as the type of the feature, the position in the image, the likelihood of the feature to be extracted, and the feature detection level. In this embodiment, features indicated by a to d in FIG. 5 are extracted from the input image (i in FIG. 4) in this stage. Referring to FIG. 5, a, b, c, and d indicate the extraction results of a vertical edge, a horizontal edge, a rightward oblique edge, and a leftward oblique edge.

In FIG. 5, a position where the result of filtering in each position of the image is 0 is gray, positive values are represented by high luminance values, and negative values are represented by low luminance values. That is, in the images shown in FIG. 5, in a position having a high luminance value, an edge in a direction corresponding to the type of each filter is extracted. In a position having a low luminance value, an edge in a direction opposite to the direction corresponding to the type of each filter is present. A gray portion having an intermediate luminance value indicates a position where no edge is extracted.

Since differential filters are used to extract features, the absolute values of values obtained by filtering exhibit sharpness of edges. That is, in each position of the input image, the larger the change in luminance value in a direction corresponding to the type of filter, the larger or smaller the luminance value of the position.

Similar to the features extracted by the initial feature extractor 22, the local features extracted by the local feature extractor 23 by using the initial feature extraction results obtained by the initial feature extractor 22 are desirably constituent elements of features to be extracted by the partial feature extractor 24 as a higher layer.

In this embodiment, the partial feature extractor 24 extracts the eye and mouth. Therefore, the local feature extractor 23 extracts features as indicated by portions surrounded by circles in 1-*a* to 4-*d* of FIG. 6. That is, the local feature extractor 23 extracts two types of features, i.e., the left and right end points as the end points of an edge line segment corresponding to, e.g., the corners of the eye or the two ends of the mouth. The local feature extractor 23 also extracts two types of edge line segments having specific lengths, i.e., a feature corresponding to the upper portion of the eye or the upper portion of the lips, and a feature corresponding to the lower portion of the eye or the lower portion of the lips.

Figure 6:
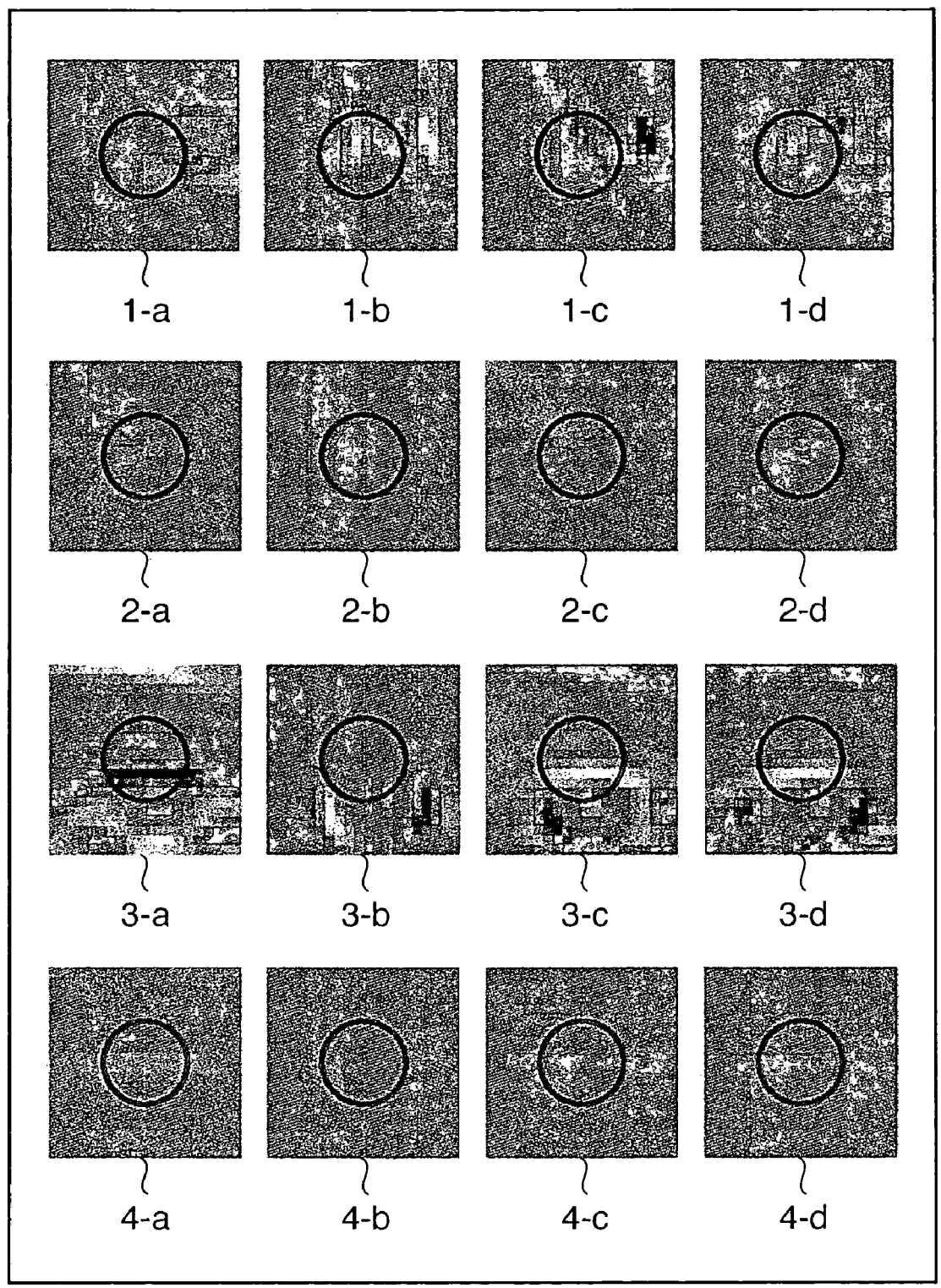
FIG. 6 is a view showing the initial feature extraction results at positions where local features to be extracted are present.

1-*a* to 1-*d* in FIG. 6 indicate the initial feature extraction results in a position where the left end point (the inner corner of the left eye in FIG. 6) is present. That is, 1-*a*, 1-*b*, 1-*c*, and 1-*d* indicate the extraction results of the vertical edge, the horizontal edge, the rightward oblique edge, and the leftward oblique edge, respectively. 2-*a*, 2-*b*, 2-*c*, and 2-*d* indicate the extraction results of the initial features (vertical, horizontal, rightward oblique, and leftward oblique edges, respectively) in a position where the right end point (the end point of the mouth in FIG. 6) is present. 3-*a*, 3-*b*, 3-*c*, and 3-*d* indicate the extraction results of the initial features (vertical, horizontal, rightward oblique, and leftward oblique edges, respectively) in a position where the upper portion of the eye or the upper portion of the lips (the upper portion of the right eye in FIG. 6) is present. 4-*a*, 4-*b*, 4-*c*, and 4-*d* indicate the extraction results of the initial features (vertical, horizontal, rightward oblique, and leftward oblique edges, respectively) in a position where the lower portion of the eye or the lower portion of the lips (the lower portion of the lips in FIG. 6) is present.

In this embodiment, a method of extracting each feature is as follows. First, a two-dimensional mask unique to each feature extracted by the initial feature extractor 22 is prepared. Then, in each position of the feature extraction results as indicated by a to d in FIG. 5, a filtering process (convolution arithmetic) is performed using the two-dimensional mask unique to a feature to be extracted. Each feature is extracted by integrating the results of filtering performed for the individual initial feature extraction results.

The prepared unique two-dimensional mask corresponds to the distribution (1-*a* to 1-*d* in FIG. 6) of the initial feature extraction results in a position where the feature to be extracted (e.g., the feature such as the left end point in FIG. 6) is present. That is, the two-dimensional mask is so set that the value obtained by filtering is large if the initial feature extraction result distribution is unique around the position where the feature to be extracted is present.

The two-dimensional mask is set as follows. First, a plurality of test patterns are simply given, and the value of each element of the two-dimensional mask is so adjusted that the result of filtering has a large value if the given test pattern is a feature to be extracted. Also, the value of each element of the two-dimensional mask is so adjusted that the result of filtering has a small value if the given test pattern is not a feature to be extracted. It is also possible to set the value of each element of the two-dimensional mask by using knowledge obtained in advance.

As in the initial feature extractor 22, each feature extracted by the processing as described above is held as information such as the type of the extracted feature, the position in the image, the likelihood of the feature to be extracted, and the feature detection level. In this embodiment, for each of the four types of features, i.e., the two types of end points and the edge line segments having the two types of specific lengths, filtering is performed for each initial feature by using the position where the feature is extracted and the two-dimensional mask unique to the feature. The results of filtering are integrated and recorded as the likelihood of the feature.

The processing performed by the partial feature extractor 24 is analogous to that performed by the local feature extractor 23; partial features are extracted from a plurality of local feature extraction results obtained by the local feature extractor 23 as the feature extraction results of a lower layer. The partial features to be extracted are also desirably features to be extracted by the face extractor 26 as a higher layer, i.e., constituent elements of the face in this embodiment.

In this embodiment as described above, the partial feature extractor 24 extracts, e.g., the eye and mouth. The process of extraction is the same as the extraction method of the local feature extractor 23; features need only be extracted by filtering using specific two-dimensional masks. Alternatively, it is also possible to simply extract the eye and mouth in accordance with whether, in the feature extraction results obtained by the local feature extractor 23, features having likelihoods of a predetermined value or more have a specific spatial positional relationship.

Each of the eye and mouth extracted as described above is also held as information such as the type of the extracted feature, the position in the image, the likelihood of the feature to be extracted, ad the feature amount. In this embodiment, the results of filtering performed for the local feature extraction results by using the two-dimensional masks unique to the eye and mouth are integrated in each position of the image, and held as the likelihood in the position of each partial feature.

The partial feature distribution determinator 25 performs simple distribution analysis on the feature extraction results obtained by the partial feature extractor 24. In addition, on the basis of the analytical result, the partial feature distribution determinator 25 gives an activation instruction to one or a plurality of predetermined face extraction modules of the face extractor 26.

Unlike in the processes performed from the initial feature extractor 22 to the partial feature extractor 24, the analysis herein mentioned extracts necessary conditions for each predetermined face extraction module to which the activation instruction is to be given. For example, in this embodiment, this analysis determines whether the eye is extracted near predetermined coordinates in the input image by the processing of the partial feature extractor 24. The analysis also determines whether the barycentric position of the mouth extraction results obtained by the processing of the partial feature extractor 24 is in the vicinity of the predetermined coordinates. Alternatively, the analysis determines whether the total of the likelihoods of the eye as the processing results of the partial feature extractor 24 is equal to or larger than a predetermined value.

These analyses as described above can be performed by presetting conditions corresponding to modules which make up the face extractor 26 and perform face extraction corresponding to a plurality of variances. The variances herein mentioned are changes in features obtained by, e.g., affine transformation such as rotational transformation and size transformation, and transformation corresponding to, e.g., a case in which the face is turned to the side. For example, one necessary condition set for a face extraction module corresponding to a clockwise planar rotational variance is that the barycenter of the mouth extraction results is present off to the lower left of the center of the image, and the barycenter of the eye extraction results is off to the upper right of the barycenter of the mouth extraction results.

Several analyses as described above are performed, and an activation instruction is issued to predetermined face extraction modules meeting the conditions of analysis. The barycenters and the total of likelihoods may also be analyzed within a predetermined range, e.g., a position where the eye is expected to exist. It is also possible to compare the totals of likelihoods of two or more features. Since modules for feature extraction are thus selected by the analyses having the simple necessary conditions as described above, the processing cost can be reduced, and identification errors can also be reduced.

In the face extractor 26, only predetermined face extraction modules having received the activation instruction from the partial feature distribution extractor 25 perform a feature extraction process similar to that of the partial feature extractor 24 by using the extraction results of the eye and mouth obtained by the partial feature extractor 24. Examples of prepared modules corresponding to specific variances are a module specialized to a variance in size (ii in FIG. 4), a module specialized to a variance caused by planar rotation (iii in FIG. 4), a module specialized to a variance caused by a horizontal shake of the face (iv in FIG. 4), and a module specialized to a variance caused by a vertical shake of the face.

In this embodiment, a specific two-dimensional mask is prepared for each module corresponding to the variance as described above, and only a module having received the activation instruction performs filtering by using the specific two-dimensional mask. The two-dimensional mask is set in the same manner as explained for the local feature extractor 23; the two-dimensional mask is set by giving, as a test pattern, a face having a specific variance corresponding to a module so that the module is specialized to the corresponding variance.

This face extraction is performed by using the face around the center of the image as a target. Therefore, unlike the feature extraction processes up to the partial feature extractor 24, filtering need not be performed in each position of the image but need only be performed within the face extraction range of the image.

The detection result output unit 27 performs final input image category classification from the results of filtering performed by those modules corresponding to the variances, which have received the activation instruction and performed the face extraction process. In this embodiment, the detection result output unit 27 simply determines whether the output value of each activated face extraction module has exceeded a threshold value set for the module. If the output value of at least one module has exceeded the threshold value, the detection result output unit 27 determines that the input image is a face image; if not, the detection result output unit 27 determines that the input image is a non-face image.

This determination is not limited to the above method. For example, final determination may also be performed by integrating the output values of the activated modules. More specifically, identification errors can be reduced by suppressing the outputs of modules having conflicting variances. For example, it is possible to subtract, from the output value of a module corresponding to a clockwise planar rotational variance, the output value of a module corresponding to a counterclockwise planar rotational variance, as an opposite variance category, after a predetermined weight is added to the latter output value.

Also, the threshold values for identification can be increased by promoting the outputs of modules corresponding to similar variances. As a consequence, identification errors can be reduced. For example, it is possible to add, to the output module corresponding to a face having a specific size, the output value of a module corresponding to a face having a size slightly larger than the specific size, which is a similar variance category, after a predetermined weight is added to the latter output value.

It is also possible to perform weighted addition or a simple arithmetic mean operation for the output values of two or more modules corresponding to similar categories as described above, and newly set the obtained value as an output value of a virtual feature extraction module corresponding to an intermediate variance between the categories. Consequently, high-accuracy identification can be performed with a low processing cost without any identification errors.

The above first embodiment is explained as an example of a method of identifying whether input two-dimensional image data is a certain specific category, wherein a face image in which the center of a face is present in substantially the center of the input image and a non-face image which is an image other than the face image are assumed as identification categories, and whether the input image data is one of these two categories is identified.

(Second Embodiment)

In the second embodiment, a method of detecting the position of a face in input two-dimensional image data will be described as a modification of the above first embodiment. In this embodiment, a process of detecting the face in an image will be explained below. However, as in the first embodiment, the application of the present invention is not limited to the process of detecting the face in an image. That is, the present invention is also applicable to a process of detecting another image pattern or a predetermined pattern from input voice data. In addition, the present invention can be applied to detection of objects of a plurality of categories.

In this embodiment, as a method of detecting, with robustness against variances, a specific pattern from two-dimensional image data by hierarchical feature extraction, the basic configuration of a convolutional neural network (to be referred to as CNN hereinafter) is changed. FIG. 7 shows the basic CNN arrangement. The basic processing of the CNN will be explained below with reference to FIG. 7. In FIG. 7, the processing flows to the right from the left end as an input end.

In FIG. 7, reference numeral 71 denotes a pixel value distribution corresponding to, e.g., the luminance value of an input image. Reference numerals 72, 74, 76, and 78 denote feature detecting layers. Reference numerals L7-21, L7-22, L7-23, L7-24, L7-41, L7-42, L7-43, L7-44, L7-61, L7-62, and L7-81 in these layers denote feature detecting cell planes. Reference numerals 73, 75, and 77 denote feature integrating layers. Reference numerals L7-31, L7-32, L7-33, L7-34, L7-51, L7-52, L7-53, L7-54, L7-71, and L7-72 in these layers denote feature integrating cell planes.

In the CNN, two layers, i.e., a feature detecting layer and feature integrating layer are combined as one set, and these layers are hierarchically arranged. Each feature detecting cell plane in the feature detecting layer has a feature detecting neuron which detects a certain specific feature. Each feature detecting neuron is connected to the feature detection result of a layer in the preceding stage by a weight distribution unique to each feature detecting cell plane, within a local range corresponding to the position of the feature detecting neuron. For example, a feature detecting neuron in the feature detecting layer 74 is connected to the feature detection results from L7-31 to L7-34, and a feature detecting neuron in the feature detecting layer 72 is connected to the input image 71, by a weight distribution unique to each feature detecting cell plane (e.g., L7-21).

This weight corresponds to a differential filter for extracting an edge or a two-dimensional mask for extracting a specific feature described in the first embodiment. As described in the first embodiment, this weight can be set by using knowledge obtained in advance, or by learning which gives a plurality of test patterns. It is also possible to set the weight by using a known neural network learning method, e.g., learning using the back propagation method, or self-organizing learning using Hebb Learning Law.

Each feature detecting neuron is added, with a predetermined weight, to the feature detection result of a feature cell plane as the destination of connection. If the neuron is in the feature detecting layer 72, it is added, with a predetermined weight, to the luminance value or the like of an input image. In addition, the value of the operation result is transformed by a nonlinear function such as a hyperbolic tangent function, and the obtained value is used as the output value of the feature detecting neuron, thereby detecting a feature.

For example, if L7-21 is a cell plane for detecting a vertical edge, each feature neuron in L7-21 performs weighted addition corresponding to a differential filter, with respect to the luminance value of an input image. In this manner, in a position of the input image where a vertical edge is present, the value of the operation result performed by the feature detecting neurons in L7-21 increases, and this increases the output value. That is, a feature is detected.

This similarly applies to other feature detecting cell planes; in a position of each feature detecting cell plane where a specific feature is detected, a feature detecting neuron outputs a large value. Although the output value is generally calculated by nonlinear transformation as described above, the calculation method is not limited to this transformation.

Each feature integrating cell plane (e.g., L7-31) in a feature integrating layer (e.g., 73) has a feature integrating neuron which is connected to one feature detecting cell plane (e.g., L7-21) of a feature detecting layer (e.g., 72) as a layer in the preceding stage, and connected within a local range to the feature detecting results in the preceding stage to diffuse (integrate) the feature detecting results. Each feature integrating neuron basically performs the same arithmetic as the feature detecting neuron described above. The characteristic of this feature integrating neuron is that a weight distribution corresponding to a specific two-dimensional mask is a Gaussian filter or a low-pass filter.

The network structure of the CNN gradually detects high-order features from initial features by using the hierarchical feature detecting and integrating processes as described above, and finally categorizes the input. Specific image detection can be performed by detecting high-order features from an input image by the above processing. The CNN is characterized in that identification which is robust against variances having various patterns can be performed by hierarchical feature extraction and by diffusion by the feature integrating layers.

Figure 9A:
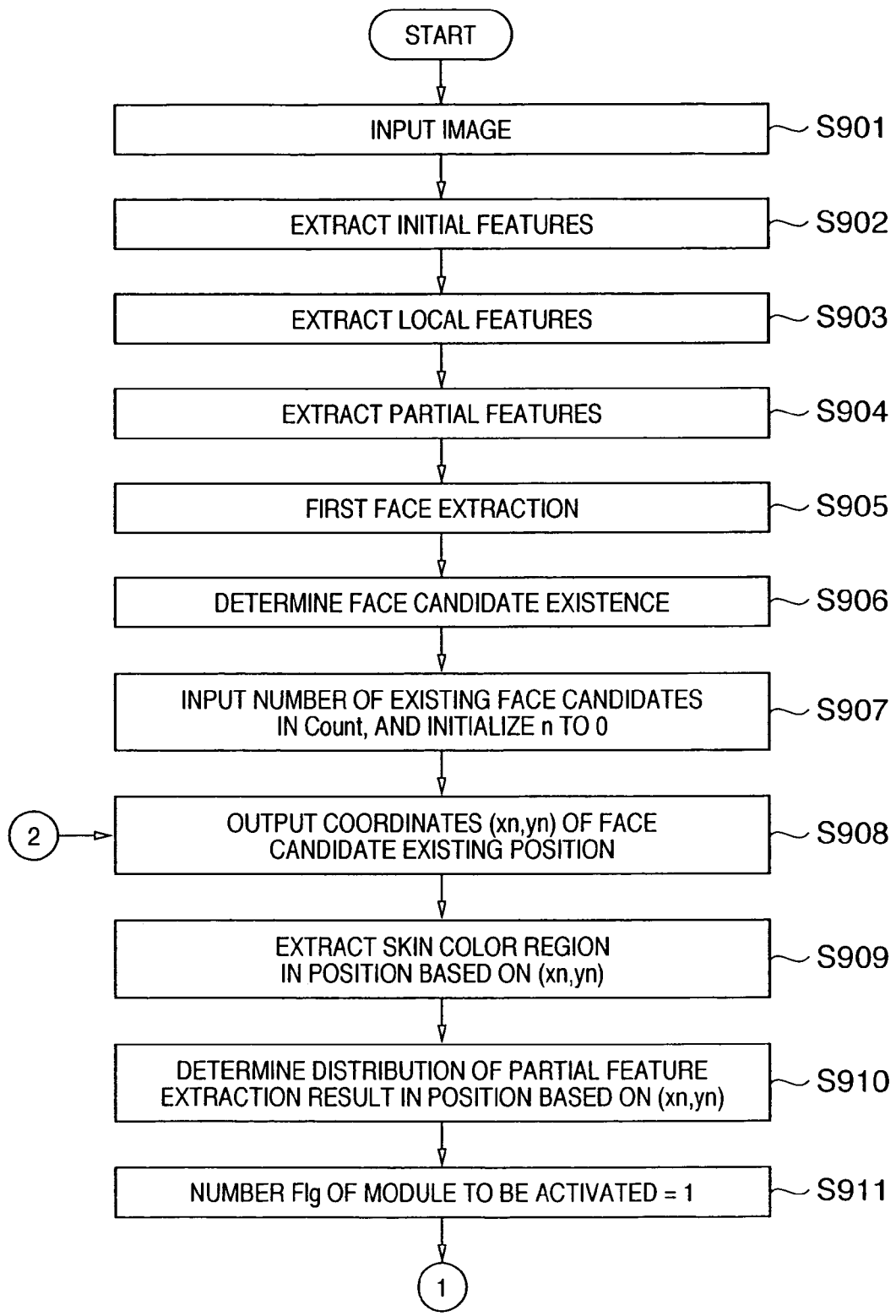
FIGS. 9A and 9B are flowcharts showing the flow of processing in the second embodiment.
Figure 9B:
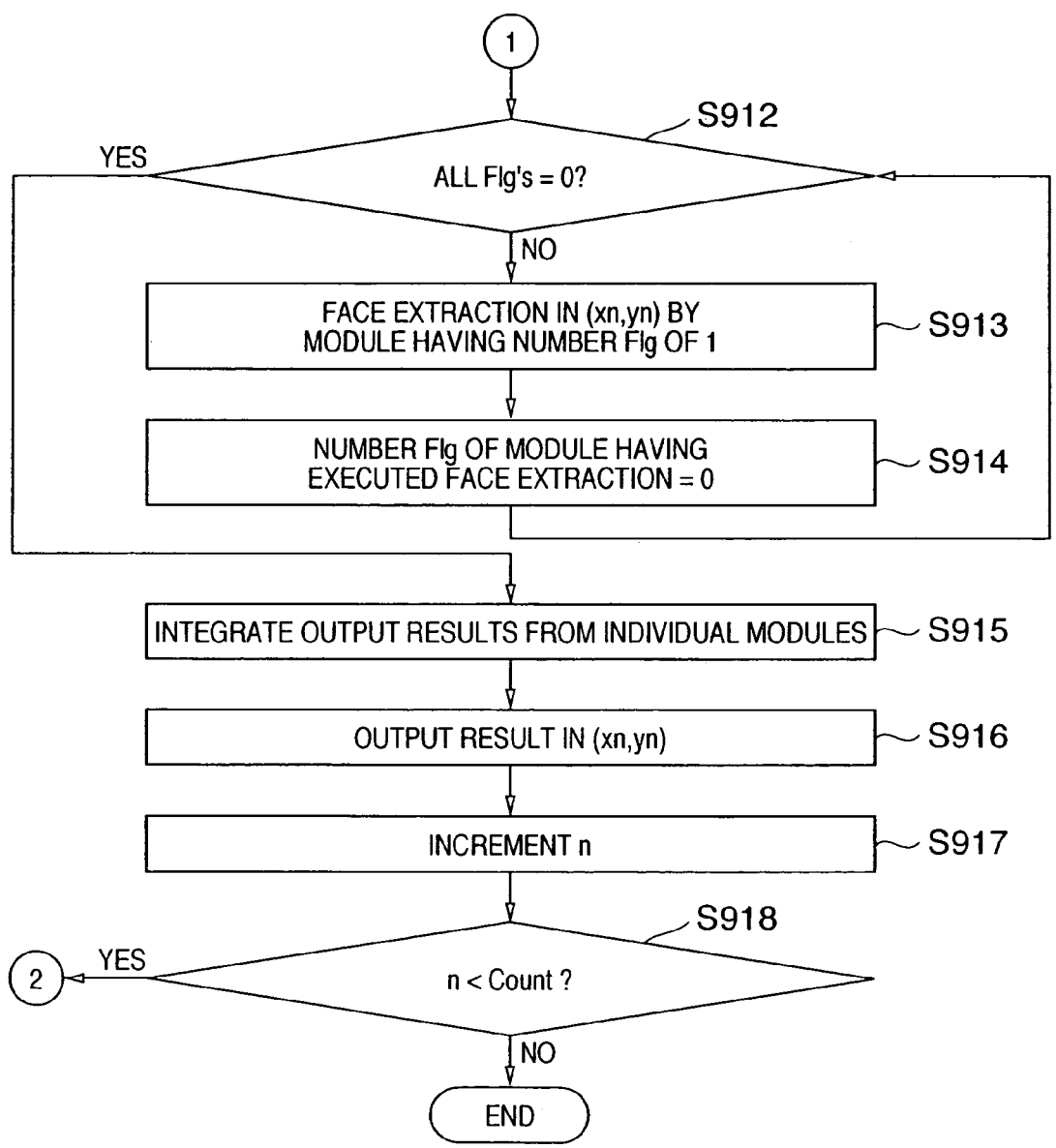

This embodiment will be described below by taking the CNN described above as the basic hierarchical feature extraction process configuration. FIG. 8 shows the arrangement of processors according to this embodiment. FIG. 9 shows the flow of processing according to this embodiment. The processing of this embodiment will be explained below with reference to FIGS. 8 and 9.

Referring to FIG. 8, an image input unit 801, initial feature extractor 802, local feature extractor 803, and partial feature extractor 804 are similar to the image input unit 21, initial feature extractor 22, local feature extractor 23, and partial feature extractor 24, respectively, of the first embodiment. Also, processes in steps S901 to S904 are the same as in steps S301 to S304 of FIG. 3.

In this embodiment, an RGB color image is used in the image input unit 801, and a grayscale image obtained by converting this RGB color image is input to the initial feature extractor 802 in the next layer. In addition, processing performed by the CNN described above is used in feature extraction, and each feature extractor integrates a feature detected in a feature detecting layer and a feature detected in a feature integrating layer. The types of features extracted by the local feature extractor 803 and partial feature extractor 804 are analogous to those of the first embodiment. Also, similar to the method of setting a unique two-dimensional mask explained in the first embodiment, a weight distribution unique to each feature detecting cell plane for detecting a feature is set by learning by inputting a plurality of test patterns.

In this embodiment, features to be extracted by the initial feature extractor 802 are not limited beforehand. Instead, the back propagation method is used when features detected by the local feature extractor 803 are learned, thereby learning a weight distribution unique to each feature detecting cell plane for detecting a local feature, and automatically setting a weight distribution unique to each feature cell plane for detecting an initial feature. In this manner, a weight distribution coupled with the input image 71 can be automatically set so that the initial feature extractor 802 extracts initial features which make up a local feature detected by the local feature extractor 803, and are necessary to detect the local feature.

In step S905, a first face extractor 805 performs the same processing as the above-mentioned feature extraction method for the eye and mouth extraction results obtained by the partial feature extractor 804, thereby extracting the face in the image.

If the output value from the first face extractor 805 exceeds a predetermined threshold value, a face candidate existence determinator 806 determines that a candidate for the face exists (step S906). Then, the face candidate existence determinator 806 sets the number of face candidates in Count (step S907), sequentially outputs the coordinates of the face candidate existing positions found to have the face candidates, and issues an activation instruction to a skin color region extractor 807 and partial feature distribution determinator 808 (step S908).

When receiving the activation instruction from the face candidate existence determinator 806, the skin color region extractor 807 extracts a skin color region from the input image within a range based on the face candidate existence position coordinates (step S909). The partial feature distribution determinator 808 determines the distribution of the partial feature extraction results within the range based on the face candidate existence position coordinates (step S910). In addition, as in the first embodiment, the partial feature distribution determinator 808 turns on the flags of face extraction modules to be activated (step S911).

The partial feature distribution determinator 808 of this embodiment differs from the partial feature distribution determinator 25 of the first embodiment in that the partial feature distribution determinator 808 uses not only the feature extraction results from the partial feature extractor 804 but also the skin color region extraction results from the skin color region extractor 807. The partial feature distribution determinator 808 performs simple distribution analysis on these feature extraction results, and includes face extraction modules corresponding to a plurality of variances. The partial feature distribution determinator 808 is also a processor which issues an activation instruction to a second face extractor 809. Note that one face extraction module in this embodiment corresponds to one feature detecting cell plane in the CNN.

As in the first embodiment, the second face extractor 809 causes face extraction modules corresponding to variances to perform face extraction. That is, the second face extractor 809 sequentially causes face extraction modules having ON flags to perform face extraction at the face candidate existence position coordinates, and turns off the flags of the face extraction modules having executed face extraction (steps S911 to S914).

Unlike in the first embodiment, the face extraction process in this embodiment extracts a face corresponding to specific variances by using not only the eye and mouth feature extraction results obtained by the partial feature extractor 804, but also the feature extraction results corresponding to the upper portion of the eye or the upper portion of the lips obtained by the local feature extractor 803, and the skin color region extraction results obtained by the skin color region extractor 807.

On the basis of the face extraction results from the second face extractor 809, a detection result output unit 810 outputs a result indicating the position of the face in the input image. That is, the detection result output unit 810 integrates the output results from the individual modules (step S914), and outputs a detection result in the face candidate existence position (S915). The flow then loops to detection in the next face candidate existence position (steps S917 and S918).

Details of the processes performed by the processors on and after the first face extractor 805 in this embodiment will be explained below.

The face extraction process performed by the first face extractor 805 is the same as the feature extraction processes performed by the local feature extractor 803 and partial feature extractor 804. This face extraction is made up of only one module, although the face extractor 26 of the first embodiment has a plurality of face extraction modules corresponding to variances. Also, unlike in the first embodiment, the position of a face in an image is detected in this embodiment. Therefore, face extraction is performed not only near the center of the image but also in different positions of the image.

A unique weight distribution of each face detecting neuron, which is used in extraction and connected to the partial feature extraction result obtained by the partial feature extractor 804 is set on the basis of learning by which faces having various variances (e.g., faces having various variances as indicated by i to iv in FIG. 4) are given as test data. This learning increases the possibility that a non-face portion is regarded as a face, i.e., decreases the accuracy. However, faces having various variances can be extracted by a single module. This processor detects features by using the learned weight distribution as described above, and the feature integrating layer integrates the results.

For the results of the face extraction process performed by the first face extractor 805, the face candidate existence determinator 806 determines a portion where the output is equal to or larger than a predetermined threshold value. The face candidate existence determinator 806 determines that a face candidate exists in the determined position, and issues an activation instruction to the skin color region extractor 807 and partial feature distribution determinator 808 to perform processing within the range in which this candidate exists.

Upon receiving the activation instruction from the face candidate existence determinator 806, the skin color region extractor 807 extracts a skin color region near the range within which the face candidate exists. In this embodiment, in a region in which a skin color region is extracted, an RGB color input image is converted into an HSV colorimetric system, and only pixels within the range of a specific hue (H) are extracted as a skin color region. A method of extracting a skin color region is not limited to this method, so another generally known method may also be used. For example, it is also possible to extract a skin color region by using saturation (S) or luminance (V). In addition, although a skin color region is extracted in this embodiment, a hair region or the like may also be extracted.

The partial feature distribution determinator 808 performs the same processing as the partial feature distribution determinator 25 of the first embodiment. In this embodiment, the partial feature distribution determinator 806 receives the activation instruction from the face candidate existence determinator 806, similar to the skin color region extractor 807, and analyzes the distribution of predetermined feature extraction results near the range within which the face candidate exists. In accordance with the result of the analysis, the partial feature distribution determinator 808 gives an activation instruction to the second face extractor 809 made up of face extraction modules corresponding to a plurality of specific variances, so as to select predetermined face extraction modules and perform face extraction in the face candidate existence position.

The feature extraction results analyzed by the partial feature distribution determinator 808 are the eye and mouth extraction results obtained by the partial feature extractor 804, and the skin color region extraction result obtained by the skin color region extractor 807. This analysis is the same as in the first embodiment; each module forming the second face extractor 809 and corresponding to a variance extracts a necessary condition to be met if a face exists.

Since this embodiment uses the skin color region extraction result unlike in the first embodiment, several examples of the analysis for this result will be explained below. The simplest example is the analysis of the area of an extracted skin color region. It is also possible to analyze the aspect ratio of an extracted skin color region, or analyze the relative positional relationship between the barycenters of skin color regions in the upper half and lower half of a region found to have a face candidate.

The first example serves as one necessary condition of a face extraction module corresponding to a specific size in accordance with the area. The second example is one necessary condition of a module corresponding to a horizontal shake or vertical shake of the face. The third example can be set as one necessary condition of a module corresponding to planar rotation of the face. It is also possible, by using the partial feature extraction results obtained by the partial feature extractor 804, to compare the area of a region from which the eye is extracted with the area of a skin color region, compare the area of a region from which the eye is not extracted with the area of the skin color region, or compare the area of the region from which the eye is not extracted with the area of a non-skin-color region.

Even the analysis of the area or the like as described above may also be performed only in a specific region as described in the first embodiment. For example, the area of a non-skin-color region can be analyzed in a region which is presumably a hair position. A more accurate activation instruction can be issued by adding this analysis to the analysis of the eye and mouth extraction results as in the first embodiment.

The second face extractor 809 is a processor similar to the face extractor 26 of the first embodiment, and includes a plurality of face extraction modules corresponding to specific variances. In this embodiment, unlike in the first embodiment, face extraction is performed in the face candidate existence position by using not only the eye and mouth extraction results obtained by the partial feature extractor 804, but also the skin color extraction result obtained by the skin color region extractor 807, the extraction results of faces having various variances obtained by the first face extractor 805, and the feature extraction result, among other features extracted by the local feature extractor 803, which corresponds to the upper portion of the eye or the upper portion of the lips.

The accuracy of feature extraction can be increased by thus subsidiarily using, e.g., the feature extraction result (in this embodiment, the first face extraction result) in the same layer, which is a feature on the same level, the feature extraction result (in this embodiment, the skin color region extraction result) externally inserted into the framework of hierarchical feature extraction, the feature extraction result (in this embodiment, the feature extraction result corresponding to the upper portion of the eye or the upper portion of the lips) in a layer before the immediately preceding layer, and the feature extraction result in a layer in the subsequent stage (to be explained in the third embodiment described later). Although this processing increases the processing cost, the increase in processing cost can be minimized because only a module having received the activation instruction from the partial feature distribution determinator 808 performs the feature extraction process of the second face extractor 809 only in a position where a face candidate exists.

The detection result output unit 810 is a processor similar to the detection result output unit 27 of the first embodiment. That is, from the results of feature extraction performed by those which are activated by the activation instruction from the partial feature determinator 808, of the face extraction modules forming the second face extractor 809 and corresponding to a plurality of variances, the detection result output unit 810 determines a position where the face exists in an image, and outputs the determination result. As explained in the first embodiment, the detection accuracy can be increased by integrating the outputs from a plurality of modules.

In the second embodiment as described above, an example of detection of the face existence position in the method of detecting a certain specific object in an image of input two-dimensional image data is explained.

(Third Embodiment)

The third embodiment of the present invention is a modification of the second embodiment. As in the second embodiment, this embodiment performs a process of detecting the position of a face in an image. However, this embodiment is also applicable to another image pattern or voice data. In addition, the embodiment can be applied to detection of objects of a plurality of categories.

Figure 11B:
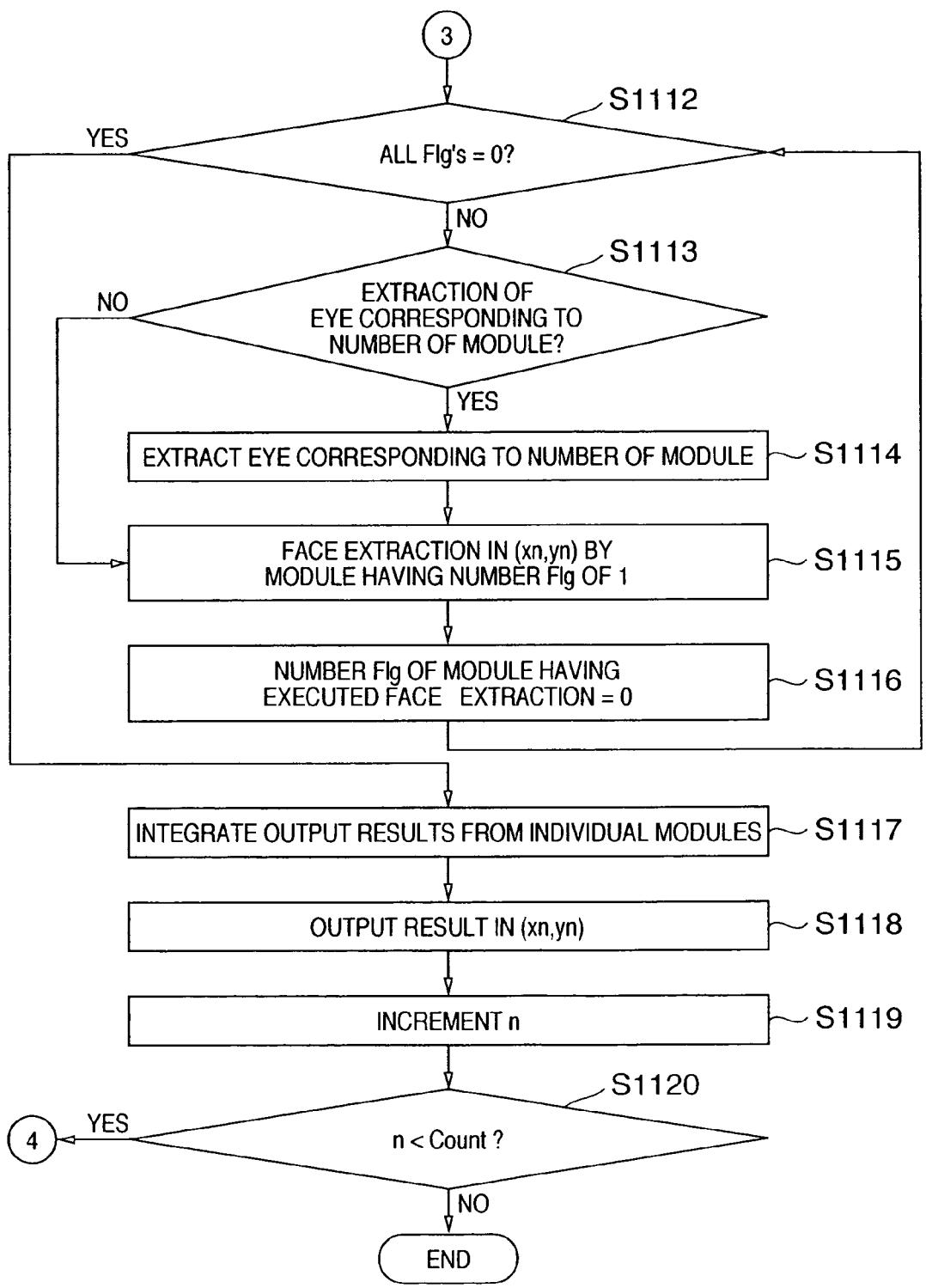

FIG. 10 shows the arrangement of processors of this embodiment. FIG. 11 shows the flow of processing of this embodiment. The basic process configuration of this embodiment is the same as explained in the second embodiment. The processing of this embodiment will be explained below with reference to FIG. 10.

Processes (steps S1101 to S1109) performed by components from an image input unit 1001 to a skin color region extractor 1007 shown in FIG. 10 are exactly the same as steps S901 to S909 in the second embodiment, so an explanation thereof will be omitted.

A partial feature distribution determinator 1008 also performs the same processing as the partial feature distribution determinator 808 in the second embodiment. However, the partial feature distribution determinator 1008 gives an activation instruction to face extraction modules corresponding to a plurality of variances in a second face extractor 1009 so as to perform a face extraction process in a face candidate existence position, in accordance with the analytical result of the distribution of feature extraction results, and also gives an activation instruction to a second partial feature extractor 1011 made up of partial feature extraction modules corresponding to a plurality of variances. That is, the partial feature distribution determinator 1008 determines the distribution of partial feature extraction results within a range based on the face candidate existence position coordinates (step S1110), and turns on the flags of face extraction modules to be activated (step S1111).

The second partial feature extractor 1011 includes a plurality of modules for extracting partial features corresponding to specific variances. Upon receiving the activation instruction from the partial feature distribution determinator 1008, a module in the second partial feature extractor 1011 re-extracts a partial feature only in a specific position determined by the face candidate existence position. That is, a partial feature extraction module corresponding a face extraction module having an ON flag performs a partial feature extraction process in a position determined by the face candidate existence position coordinates (steps S1113 and S1114).

The second face extractor 1009 is a processor substantially the same as the second face extractor 809 of the second embodiment. However, if the second partial feature extractor 1011 re-extracts partial features corresponding to the activated face extraction modules, the second face extractor 1009 performs face extraction by using the features extracted by a partial feature extractor 1004. That is, the second face extractor 1009 performs face extraction in the face candidate existence position by using a face extraction module having an ON flag, and turns off the flag of the face extraction module having executed face extraction (steps S1115 and S1116).

A detection result output unit 1010 is exactly the same as the detection result output unit 810 of the second embodiment, and steps S1117 to S1120 are also exactly the same as steps S915 to S918 of the second embodiment, so an explanation thereof will be omitted.

Details of the processes in the partial feature distribution determinator 1008, second partial feature extractor 1011, and second face extractor 1009 of this embodiment will be described below.

As described above, the partial feature distribution determinator 1008 is the same as the second embodiment in the process of analyzing the distribution of partial feature extraction results. In the second embodiment, an activation instruction is issued to modules which perform face extraction corresponding to a plurality of variances. However, the partial feature distribution determinator 1008 also issues an activation instruction to the second partial feature extractor 1011 which extracts partial features corresponding to the variances of the face extraction modules to which the activation instruction is issued. More specifically, when issuing an activation instruction to a face extraction module corresponding to, e.g., a clockwise planar rotational variance, the partial feature distribution determinator 1008 simultaneously issues an activation instruction to a partial feature extraction module corresponding to the same clockwise planar rotational variance.

The second partial feature extractor 1011 includes a plurality of modules which extract partial features corresponding to a plurality of variances. In the second partial feature extractor 1011, partial feature extraction modules corresponding to modules which have received an activation instruction from the partial feature distribution determinator 1008 and perform face extraction corresponding to a plurality of variances are activated to extract partial features only within a specific range determined by the face candidate existence position obtained as the result of the face candidate existence determinator 1006. The method of feature extraction is the same as explained in the second embodiment.

Each partial feature extraction module basically corresponds to each of the face extraction modules forming the second face extractor 1009 and corresponding to a plurality of variances. However, this correspondence need not be one-to-one correspondence. For example, a partial feature extraction module corresponding a face extraction module for a full face may also be omitted. In this case, if an activation instruction is issued to this face extraction module for a full face, the second partial feature extractor 1011 need not perform any processing.

Furthermore, one partial feature extraction module may also correspond to a plurality of types of face extraction modules. For example, a face extraction module corresponding to a 15° clockwise planar rotational variance and a face extraction module corresponding to a 30° clockwise planar rotational variance can be related to a partial feature extraction module which singly performs extraction including these two variances.

As described above, a feedback mechanism which controls the operation of feature extraction modules in a lower layer on the basis of the feature extraction result output from a higher layer is introduced. That is, the accuracy of feature extraction can be further increased by re-extracting low-order features by partial feature extraction modules corresponding to face extraction modules activated in second face extraction and corresponding to specific variances. Although this re-extraction of features increases the processing cost, the increase in processing cost can be minimized because a module having received an activation instruction performs processing only in a specific position.

In this embodiment, this processor performs only eye extraction corresponding to variances, without any mouth extraction. To further increase the feature extraction accuracy, mouth extraction corresponding to variances may also be performed, or features other than those extracted by the partial feature extractor 1004 may also be extracted.

Furthermore, in this feature extraction, eye extraction is performed by using the partial feature extraction results of, e.g., the eye and mouth obtained by the partial feature extractor 1004, and the first face extraction results obtained by the first face extractor 1005, in addition to the local feature extraction results obtained by the local feature extractor 1003. As already described in the second embodiment, the accuracy of the feature extraction process can be increased by subsidiarily using the feature extraction result in the same layer which is a feature on the same level, and the feature extraction result in a higher layer which is a feature on a higher level.

The second face extractor 1009 basically performs the same processing as the second face extractor 809 of the second embodiment. The difference from the second face extractor 809 of the second embodiment is that if, in the second partial feature extractor 1011, partial feature extraction corresponding to variances is performed in accordance with activated face extraction modules, face extraction is performed by using the results of this partial feature extraction corresponding to the variances performed in the second partial feature extractor 1011, rather than the partial feature extraction results obtained by the partial feature extractor 1004.

In this embodiment, the second partial feature extractor 1011 performs only eye extraction, so mouth extraction is performed using the extraction results from the partial feature extractor 1004. As explained above in relation to the second partial feature extractor 1011, if, for example, there is no partial feature extraction module corresponding to a face extraction module for a full face, the second partial feature extractor 1011 does not re-extract any features when an activation instruction is issued to this face extraction module for a full face.

In a case like this, the feature extraction results from the partial feature extractor 1004 can be directly used. In this embodiment, when partial feature extraction corresponding to variances is performed in relation to activated face extraction modules, the eye extraction result obtained by the partial feature extractor 1004 is not used. To further increase the accuracy, however, this feature extraction result may also be subsidiarily used.

In the third embodiment as a modification of the second embodiment as described above, an example of detection of the position of a face in a method of detecting a certain specific object in an image of input two-dimensional image data is explained.

(Fourth Embodiment)

In the fourth embodiment of the present invention, the connecting form in a hierarchical structure is changed.

FIG. 13 shows the hierarchical structure of a pattern identification apparatus according to the fourth embodiment. The outline of the pattern identification method will be described with reference to FIG. 13. A data input unit 131 inputs data for identifying patterns. The input data is basically processed from the left side to the right side in FIG. 13. Features are gradually extracted from low-order features to high-order features, and an ultimate high-order feature is extracted.

A feature extraction layer 132 has at least one feature extraction plane 133. The feature extraction plane 133 includes a large number of feature extractors and extracts a predetermined feature using the extraction result of another coupled feature extraction plane. The feature extractors within one feature extraction plane have identical structures and extract the same type of features. This feature extractor basically extracts a local feature. The predetermined features are topologically extracted from the input data by a large number of feature extractors within one feature extraction plane.

The features extracted in a normal feature extraction plane are used for feature extraction in a feature extraction layer located immediately succeeding the normal feature extraction plane. However, as shown in FIG. 13, features extracted by a reuse feature extraction plane 133a are used in feature extraction not only for the layer located immediately succeeding the plane 133a but also for a high-order feature extraction layer.

A non-hierarchical feature plane 133b inputs a feature except features hierarchically extracted from the input data. For example, the non-hierarchical feature plane 133b inputs, as a feature, information or the like from a sensor except the input data sensor.

An intra-layer reuse feature extraction plane 133c extracts a feature used in another feature extraction plane 133d within the same layer. In this embodiment, feature extraction is performed using the features extracted previously within the same layer. However, after feature extraction is performed in a higher-order layer, feature extraction may be performed in a lower-order layer using the extraction result of the higher-order layer.

With the above processes, features are gradually extracted from the input data in the order of low-order features to high-order features, and desired feature extraction is finally performed to identify the input data pattern.

Figure 14A:
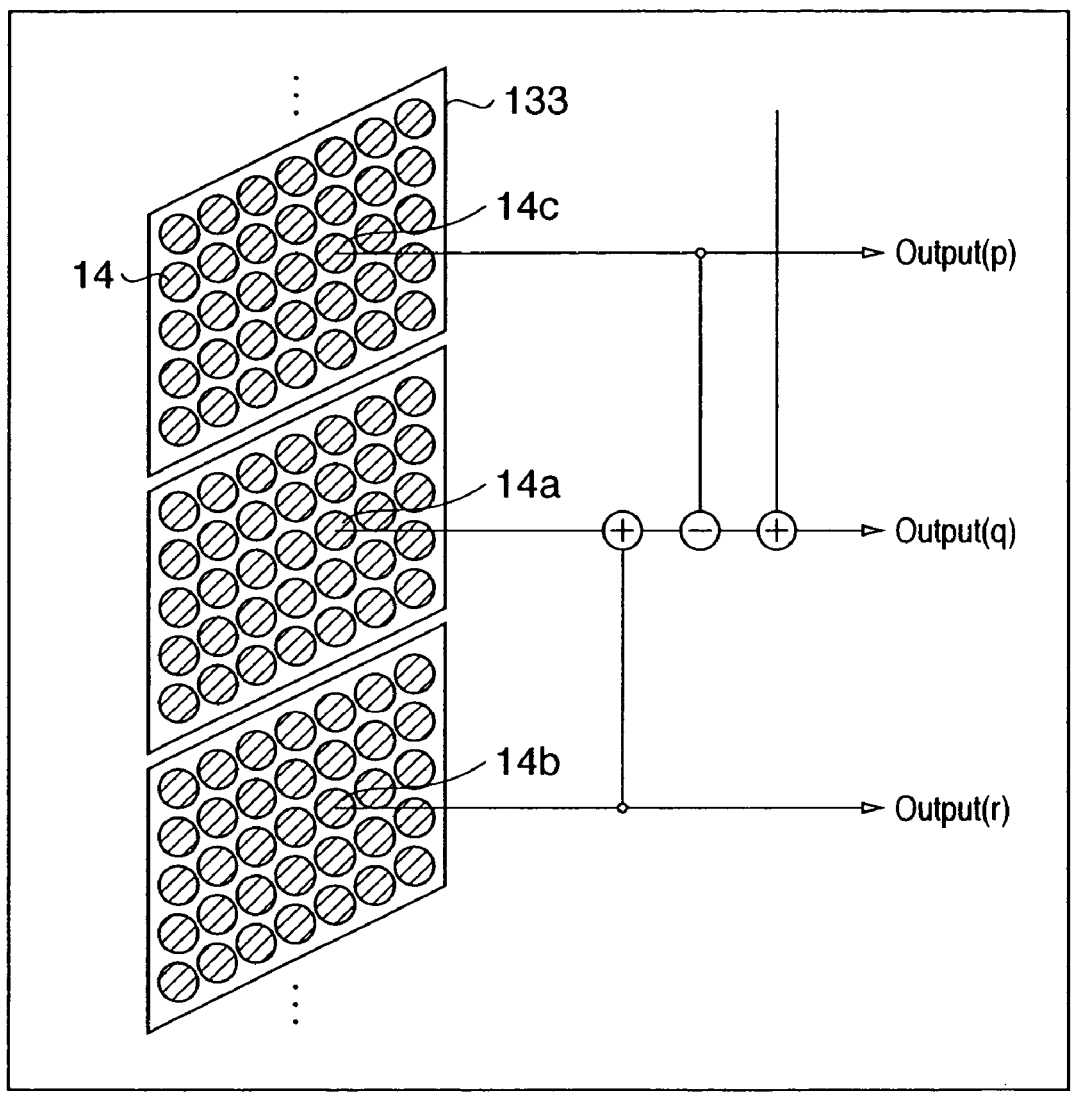
FIG. 14A is a view for explaining an integrating process according to the fourth embodiment.

FIGS. 14A and 14B are views showing the outline of a result integrating process according to this embodiment. A feature extraction plane 133 is identical to that shown in FIG. 13. A feature extractor 14 is the one described with reference to FIG. 13. The feature extractors 14 generate outputs (likelihoods of features corresponding to positions) Output(x) as the feature extraction result.

The outline of the result integrating process will be described with reference to FIG. 14A. Each feature extractor 14a is an excitation or repression feature extractor. Each feature extractor 14b gives excitation, while each feature extractor 14c gives repression. These feature extractors 14 extract different features at the same position of the input data.

A feature extracted by the excitation or repression feature extractor 14a has a higher similarity to a feature extracted by the excitation feature extractor 14b, but has a low similarity to a feature extracted by the repression feature extractor 14c. A value obtained by multiplying an output Output(r) from the excitation feature extractor 14b by a predetermined weight a is added to an output Output(q) from the excitation or repression feature extractor 14a. A value obtained by multiplying an output Output(p) from the repression feature extractor 14c by a predetermined weight β is subtracted from the output Output(q). These integrating processes make it possible to reduce identification errors at low processing cost.

The outline of the result integrating process will be described with reference to FIG. 14B. A virtual feature extraction plane 15 includes a large number of virtual feature extractors 16. Feature extractors 14e land 14f in FIG. 14B are feature extractors used for integration. The virtual feature extractor 16 is an integrated virtual feature extractor. Features extracted by the feature extractors 14e and 14f used for integration are of the same type but have different variance levels (e.g., sizes).

An output Output(q) from the integrated virtual feature extractor 16 is the average value of outputs Output(r) and Output(p) from the feature extractors 14e and 14f used for integration or a sum of the outputs Output(r) and Output(p) weighted by predetermined weighting coefficients. This result integrating process makes it possible to achieve strong identification against the variance of the input pattern at low processing cost.

Note that the above embodiments can be properly combined and practiced.

According to each embodiment described above, it is possible to perform pattern recognition capable of robust identification for the variances of an input pattern, and reducing the processing cost while decreasing the possibility of identification errors.

In the embodiments as described above, it is possible to perform pattern recognition capable of robust identification for the variances of an input pattern, and reducing the processing cost while decreasing the possibility of identification errors.

<Other Embodiments by, e.g., Software>

The present invention can be applied as part of a system constituted by a plurality of devices (e.g., a host computer, interface device, reader, and printer) or as part of a single apparatus (e.g., a copying machine or facsimile apparatus).

Also, the present invention is not limited to the apparatuses and methods which implement the above embodiments, and to a method performed by combining the methods explained in the embodiments. That is, the scope of the present invention also includes a case in which the program code of software for implementing the above embodiments is supplied to a computer (or a CPU or MPU) of the system or apparatus described above, and this computer of the system or apparatus implements the embodiments by operating the various devices described above in accordance with the program code.

In this case, the program code itself of the software implements the functions of the above embodiments, and the program code itself and a means for supplying this program code to the computer, more specifically, a storage medium storing the program code, come within the scope of the present invention.

As this storage medium storing the program code, it is possible to use, e.g., a floppy (R) disk, hard disk, optical disk, magnetooptical disk, CD-ROM, magnetic tape, nonvolatile memory card, or ROM.

The program code also falls under the scope of the present invention not only in a case in which the computer implements the functions of the above embodiments by controlling the various devices in accordance with the supplied program code, but also in a case in which the program code implements the above embodiments in collaboration with, e.g., an OS (Operating System) or another application software running on the computer.

Furthermore, the scope of the present invention also includes a case in which the supplied program is stored in a memory of a function expansion board of the computer or in a memory of a function expansion unit connected to the computer, and a CPU or the like of the function expansion board or function expansion unit implements the above embodiments by performing part or the whole of actual processing in accordance with instructions by the program code.

Figure 12:
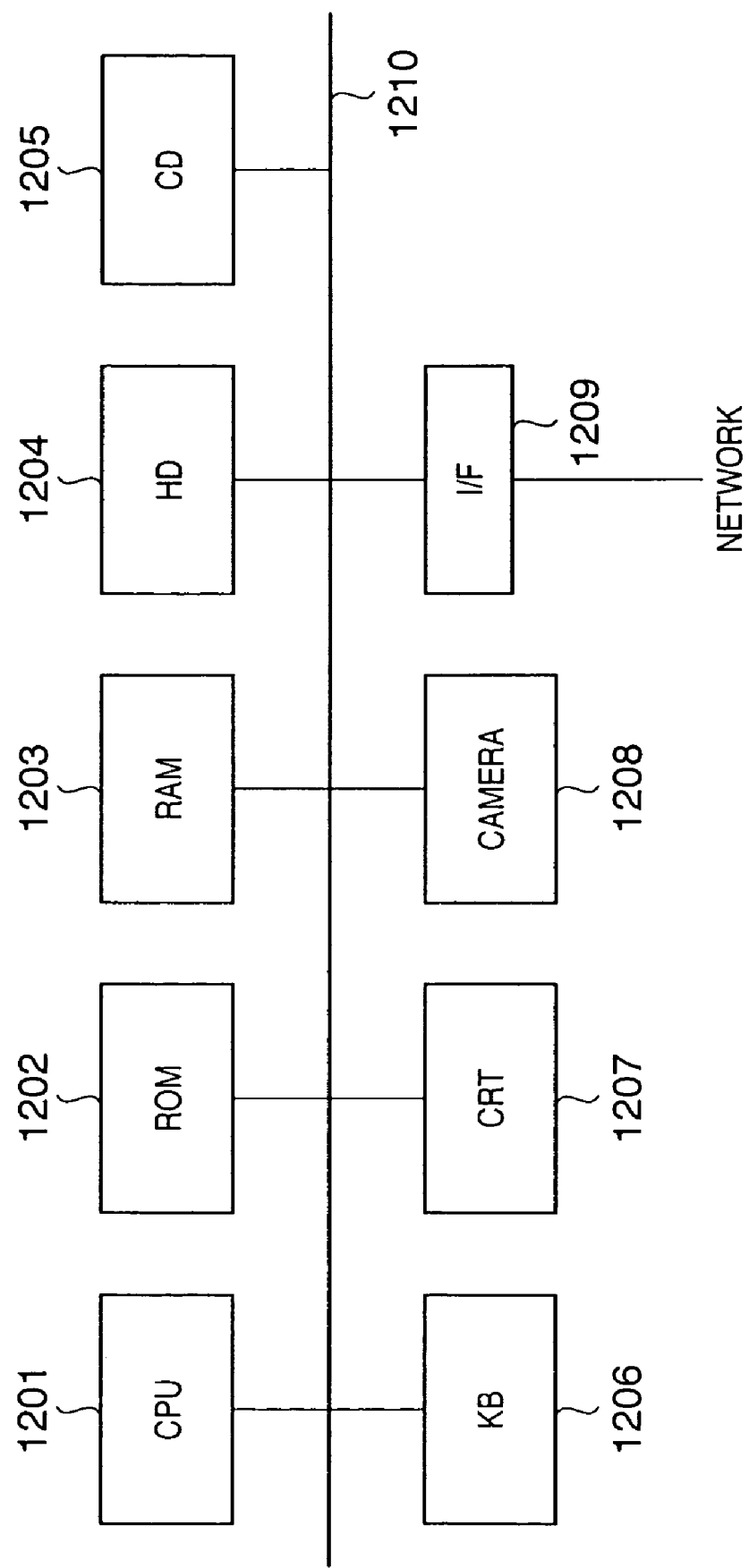
FIG. 12 is a view showing the block configuration of a computer which implements the present invention.

FIG. 12 is a view showing an example of the block configuration of an information processing apparatus which implements the present invention. As shown in FIG. 12, in this information processing apparatus, a CPU 1201, ROM 1202, RAM 1203, HD (Hard Disk) 1204, CD 1205, KB (KeyBoard) 1206, CRT 1207, camera 1208, and network interface (I/F) 1209 are connected via a bus 1210 so that they can communicate with each other.

The CPU 1201 controls the operation of the whole information processing apparatus by reading out process programs (software programs) from the HD (Hard Disk) 1204 or the like, and executing the readout programs.

The ROM 1202 stores programs and various data used in the programs.

The RAM 1203 is used as, e.g., a working area for temporarily storing process programs and information to be processed, in order to allow the CPU 1201 to perform various processes.

The HD 1204 is a component as an example of a large-capacity storage, and saves, e.g., various data such as model data, and process programs to be transferred to the RAM 1203 and the like when various processes are executed.

The CD (CD driver) 1205 reads out data stored in a CD (CD-R) as an example of an external storage, and writes data in this CD.

The keyboard 1206 is an operation unit by which a user inputs, e.g., various instructions to the information processing apparatus.

The CRT 1207 displays various pieces of directive information to a user, and various pieces of information such as character information and image information.

The camera 1208 senses an image to be identified, and inputs the sensed image.

The interface 1209 is used to load information from the network, and transmit information to the network.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2003-417973 filed on Dec. 16, 2003, which is hereby incorporated by reference herein.

The invention claimed is:

1. A pattern identification method of identifying a pattern of input data by hierarchically extracting features of the input data, comprising:
using a processor to perform the steps of:
a first feature extraction step of extracting a feature of a first layer from the input data;
an analysis step of analyzing a distribution of a feature extraction result in the first feature extraction step;
a calculation step of calculating a respective likelihood of extracting from the input data a feature of one of a plurality of categories for features of a second layer, each feature of the second layer corresponding to a combination of features of the first layer, on the basis of the distribution analyzed in the analysis step, wherein the likelihood is calculated by filtering using a mask unique to the feature to be extracted, and integrating results of the filtering;
a selection step of selecting at least one extraction module, among a plurality of extraction modules which extract features of respective categories, whose calculated likelihood of the category for the feature of the second layer to be extracted from the input data is not less than a predetermined value;
a second feature extraction step of causing the selected extraction module to extract a feature of the second layer from the input data; and
a storing step of storing the extracted feature of the second layer in a memory.

2. The method according to claim 1, wherein in the first or second feature extraction step, a feature obtained by performing a predetermined transformation to a predetermined feature is extracted.

3. The method according to claim 1, further comprising a re-extraction step of re-extracting a feature of a lower layer on the basis of a feature extraction result of a higher layer in the second feature extraction step.

4. The method according to claim 1, wherein in the analysis step, a distribution of each of a plurality of feature extraction results is analyzed, and a relative relationship between analytical results is analyzed.

5. The method according to claim 1, wherein in the analysis step, a distribution within a specific range of at least one of a plurality of feature extraction results is analyzed.

6. The method according to claim 1, wherein in the analysis step, whether the feature is extracted or not extracted within a predetermined range in a distribution of at least one of a plurality of feature extraction results is analyzed.

7. The method according to claim 1, wherein in the analysis step, a barycenter of a distribution of at least one of a plurality of feature extraction results is analyzed.

8. The method according to claim 1, wherein in the analysis step, a size of a range within which the feature is extracted or not extracted in a distribution of at least one of a plurality of feature extraction results is analyzed.

9. The method according to claim 1, wherein in the analysis step, a likelihood of at least one of a plurality of feature extraction results or a total of feature detection levels is analyzed.

10. The method according to claim 1, wherein the pattern identification is performed on a presence/absence of a face image contained in the input data.

11. The method according to claim 1, wherein the pattern identification is performed on a position of a face image contained in the input data.

12. The method according to claim 1, wherein, in the second feature extraction step, the feature of the second layer is extracted on the basis of a feature extraction result in the first layer and a feature extraction result in a layer other than the first layer.

13. The method according to claim 12, wherein the layer other than the first layer is a layer lower than the first layer.

14. The method according to claim 12, wherein the layer other than the first layer is the second layer.

15. The method according to claim 12, further comprising an integrating step of integrating feature extraction results by a plurality of feature extractors in the same layer.

16. A pattern identification apparatus for identifying a pattern of input data by hierarchically extracting features of the input data, comprising:
first feature extracting means for extracting a feature of a first layer from the input data;
analyzing means for analyzing a distribution of a feature extraction result obtained by said first feature extracting means;
calculating means for calculating a respective likelihood of extracting from the input data a feature of one of a plurality of categories for features of a second layer, each feature of the second layer corresponding to a combination of features of the first layer on the basis of the distribution analyzed by said analyzing means, wherein the likelihood is calculated by filtering using a mask unique to the feature to be extracted, and integrating results of the filtering;
selection means for selecting at least one extraction module, from among a plurality of extraction modules which extract features of respective categories, whose calculated likelihood of the category for the feature of the second layer to be extracted from input data is not less than a predetermined value;
second feature extracting means for causing the selected extraction module to extract a feature of the second layer from the input data; and
storing means for storing the extracted feature of the second layer in a memory.

17. A non-transitory computer-readable storage medium on which is stored a pattern identification program for allowing a computer to identify a pattern of input data by hierarchically extracting features of the input data, comprising:
a first feature extraction step of extracting a feature of a first layer from the input data;
an analysis step of analyzing a distribution of a feature extraction result in the first feature extraction step;
a calculation step of calculating a respective likelihood of extracting from the input data a feature of one of a plurality of categories for features of a second layer, each feature of the second layer corresponding to a combination of features of the first layer, on the basis of the distribution analyzed in the analysis step, wherein the likelihood is calculated by filtering using a mask unique to the feature to be extracted, and integrating results of the filtering;
a selection step of selecting at least one extraction module, among a plurality of extraction modules which extract features of respective categories, whose calculated likelihood of the category for the feature of the second layer to be extracted from the input data is not less than a predetermined value;
a second feature extraction step of causing the selected extraction module to extract a feature of the second layer from the input data; and
a storing step of storing the extracted feature of the second layer in a memory.

* * * * *